(12) United States Patent
Takahashi et al.

(10) Patent No.: US 7,061,981 B2
(45) Date of Patent: Jun. 13, 2006

(54) MOTION VECTOR CONVERSION METHOD AND CONVERSION APPARATUS

(75) Inventors: Kuniaki Takahashi, Kanagawa (JP);
Kazushi Sato, Kanagawa (JP);
Teruhiko Suzuki, Chiba (JP)

(73) Assignee: Sony Corporation (JP)

( * ) Notice: Subject to any disclaimer, the term of this patent is extended or adjusted under 35 U.S.C. 154(b) by 919 days.

(21) Appl. No.: 09/970,306

(22) Filed: Oct. 4, 2001

(65) Prior Publication Data

US 2002/0118745 A1 Aug. 29, 2002

(30) Foreign Application Priority Data

Oct. 11, 2000 (JP) ..................... P2000-310836

(51) Int. Cl.
*H04N 7/12* (2006.01)

(52) U.S. Cl. ............. 375/240.16; 375/240; 375/240.01; 375/240.12

(58) Field of Classification Search ................. 375/240, 375/240.01, 240.02, 240.03, 240.12, 240.16
See application file for complete search history.

(56) References Cited

U.S. PATENT DOCUMENTS

| | | | | |
|---|---|---|---|---|
| 6,647,061 | B1 * | 11/2003 | Panusopone et al. | 375/240.12 |
| 2002/0051494 | A1 * | 5/2002 | Yamaguchi et al. | 375/240.16 |
| 2002/0110193 | A1 * | 8/2002 | Yoo et al. | 375/240.02 |
| 2002/0122488 | A1 | 9/2002 | Kuniaki et al. | |

FOREIGN PATENT DOCUMENTS

| | | |
|---|---|---|
| JP | 2000-129002 | 5/2000 |
| JP | 2000-132915 | 5/2000 |
| JP | 2000-191616 | 7/2000 |
| JP | 2001309389 | 11/2001 |
| JP | 2001313948 | 11/2001 |
| JP | 2002010267 | 1/2002 |
| JP | 2002125236 | 4/2002 |
| JP | 2000-310836 | 8/2002 |

* cited by examiner

*Primary Examiner*—Allen Wong
(74) *Attorney, Agent, or Firm*—Rader, Fishman & Grauer PLLC; Ronald P. Kananen

(57) ABSTRACT

The invention provides a motion vector conversion method by which the coding efficiency in image coding of MPEG4 in an image information conversion method can be augmented. In the motion vector conversion method for an image information conversion method wherein a bit stream representative of interlaced scanned image compression information of MPEG2 is inputted and a bit stream representative of progressively scanned image compression information of MPEG4 is outputted, 16×16 motion vectors of MPEG2 of the inputted bit stream representative of image compression information of MPEG2 are accepted successively, and 8×8 motion vectors of MPEG4 and 16×16 motion vectors of MPEG4 are produced successively based on the 16×16 motion vectors of MPEG2. Every other one of I frames and P frames of the bit stream of MPEG2 is dropped to produce a bit stream of MPEG4 of a reduced frame rate and a low bit rate.

28 Claims, 35 Drawing Sheets

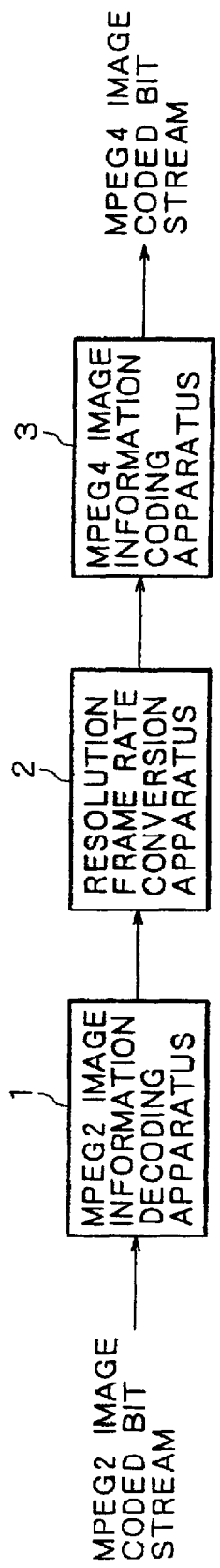

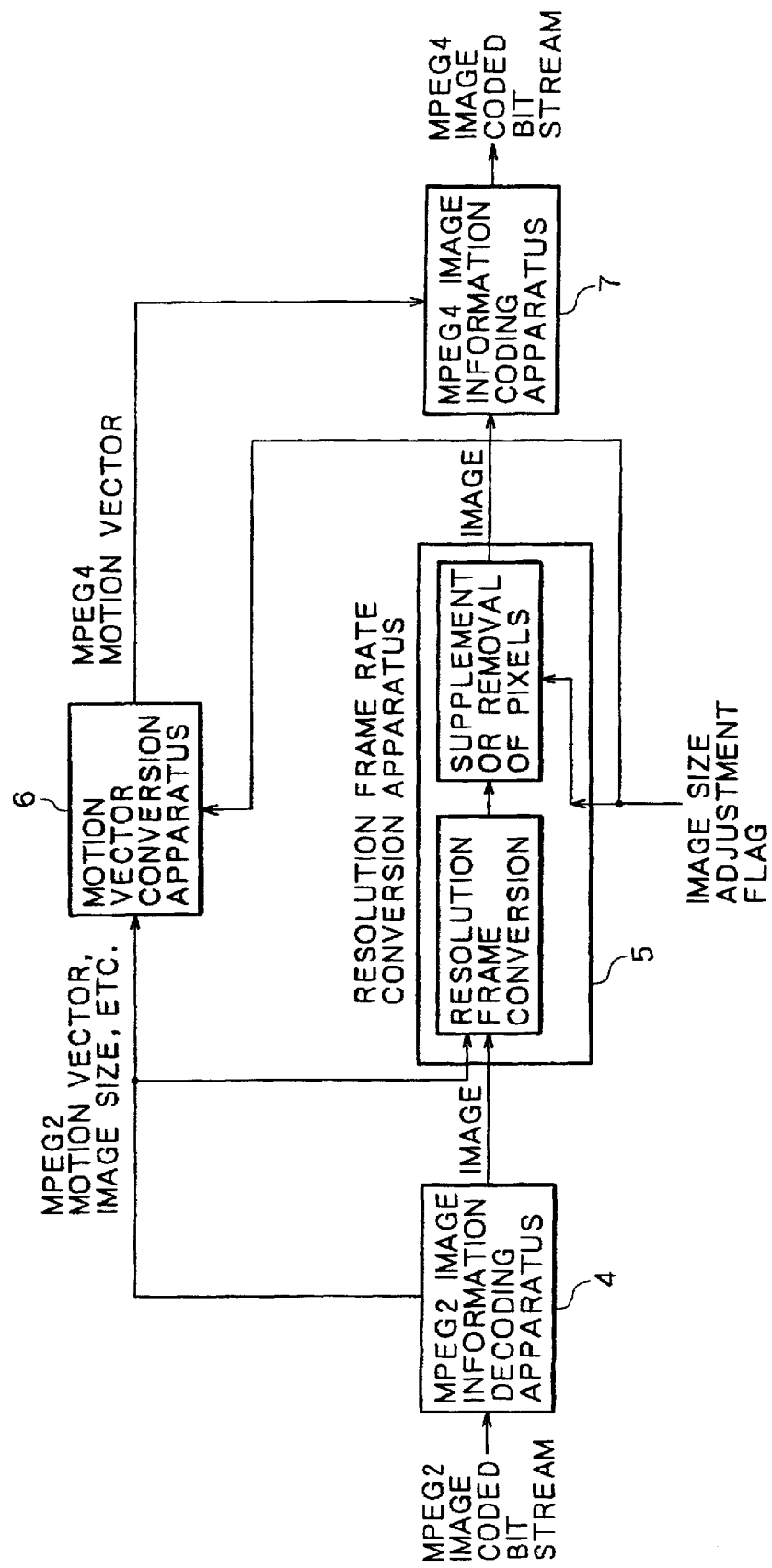

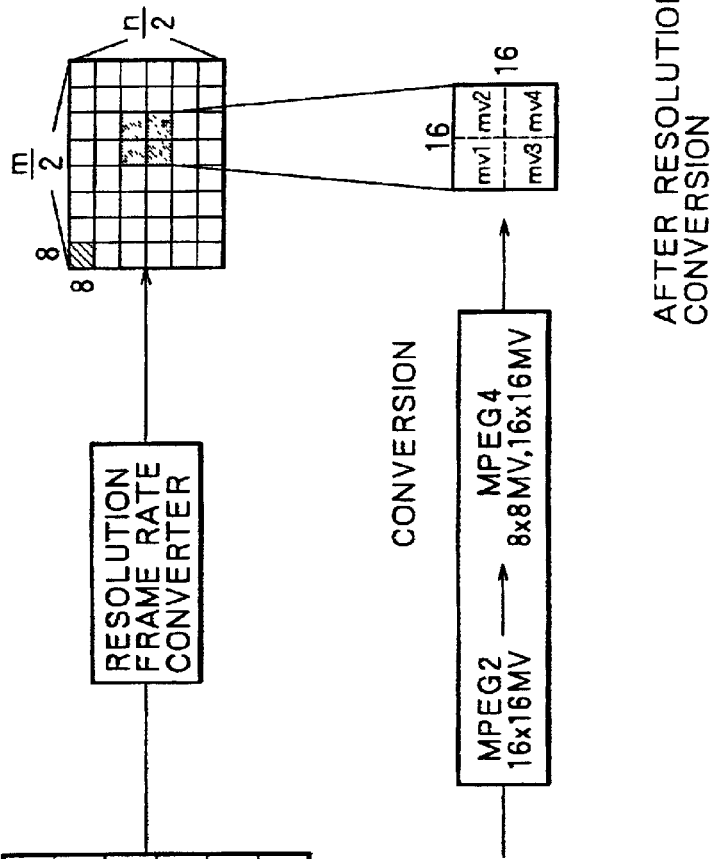
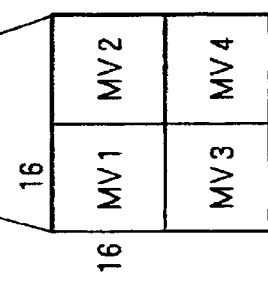
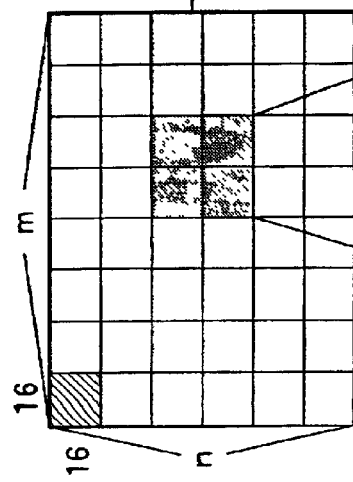
FIG. 6A  IMAGE DECODED BY MPEG2 DECODING SYSTEM
FIG. 6B  IMAGE CODED BY MPEG4 CODING SYSTEM
BEFORE RESOLUTION CONVERSION
CONVERSION: MPEG2 16×16MV → MPEG4 8×8MV,16×16MV
AFTER RESOLUTION CONVERSION

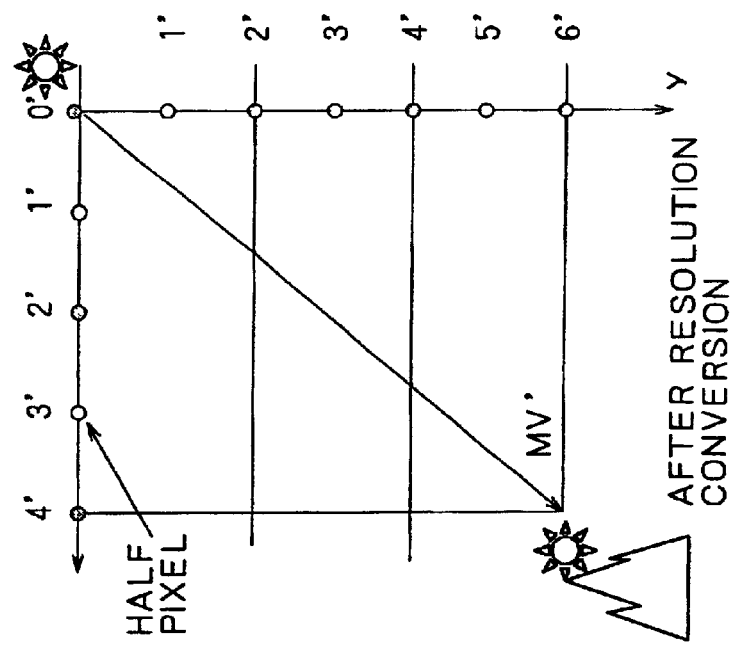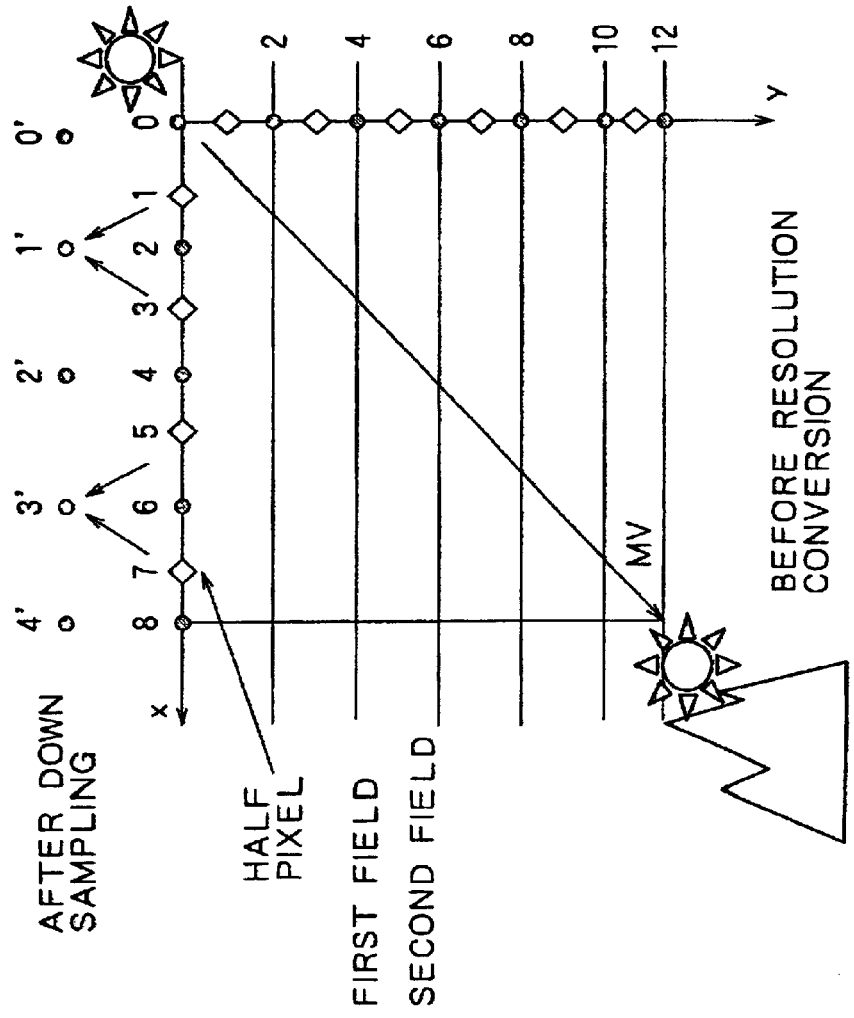

FIG. 10

| REMAINDER WHEN MOTION VECTOR MV BEFORE CONVERSION IS DIVIDED BY 4 | 0 | 1 | 2 | 3 |
|---|---|---|---|---|
| MOTION VECTOR AFTER CONVERSION | [MV/2] | [MV/2]+1 | [MV/2] | [MV/2] |

[MV/2] REPRESENTS INTEGER PART WHEN MV IS DIVIDED BY 2

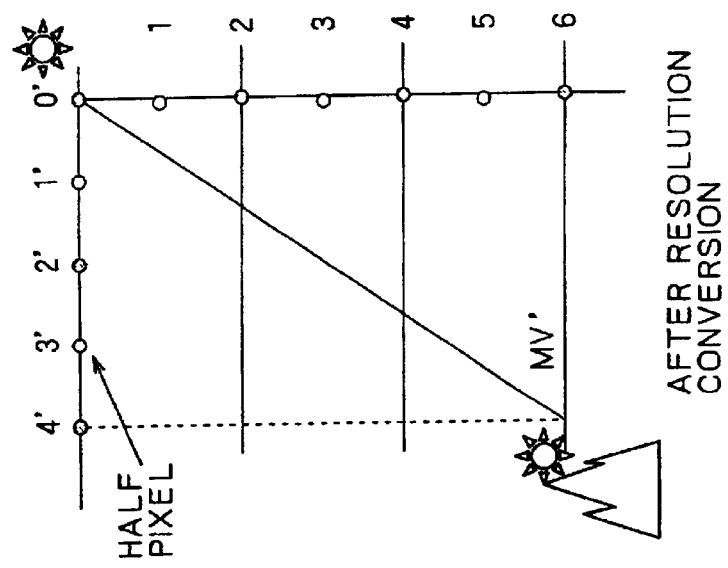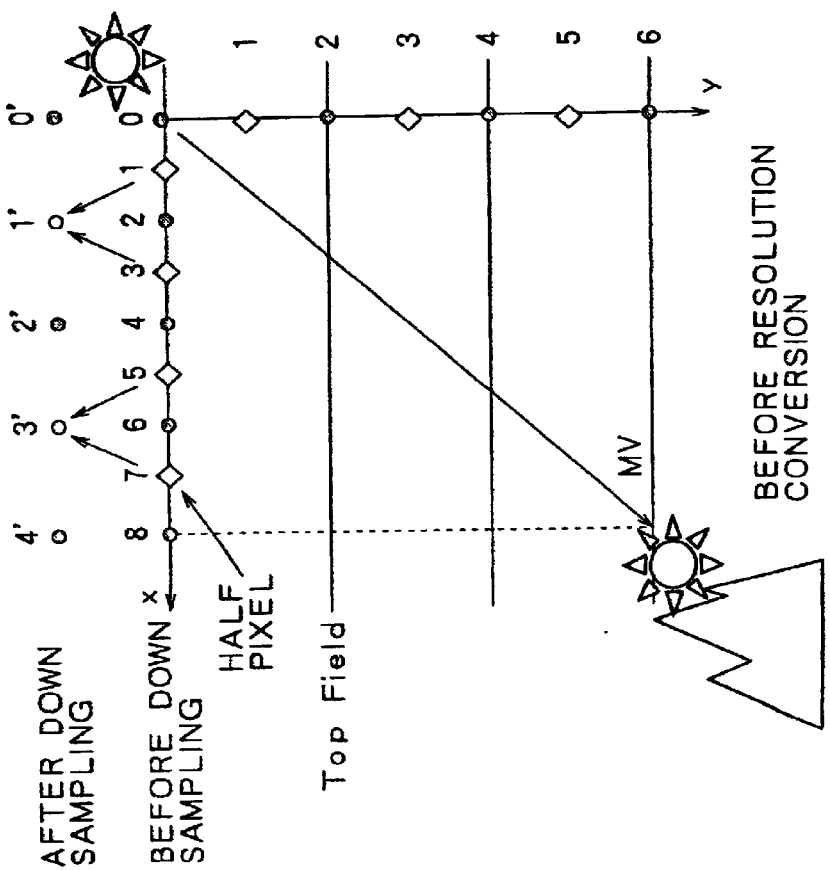

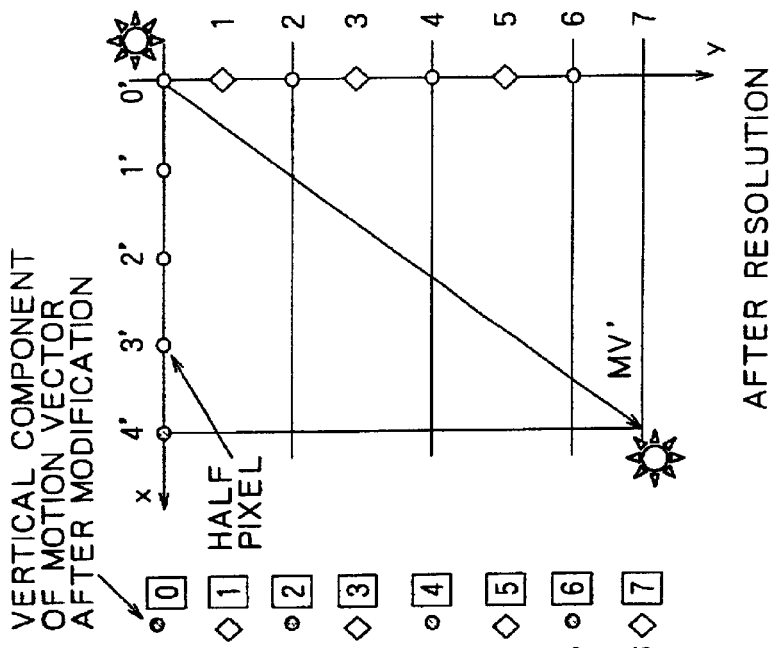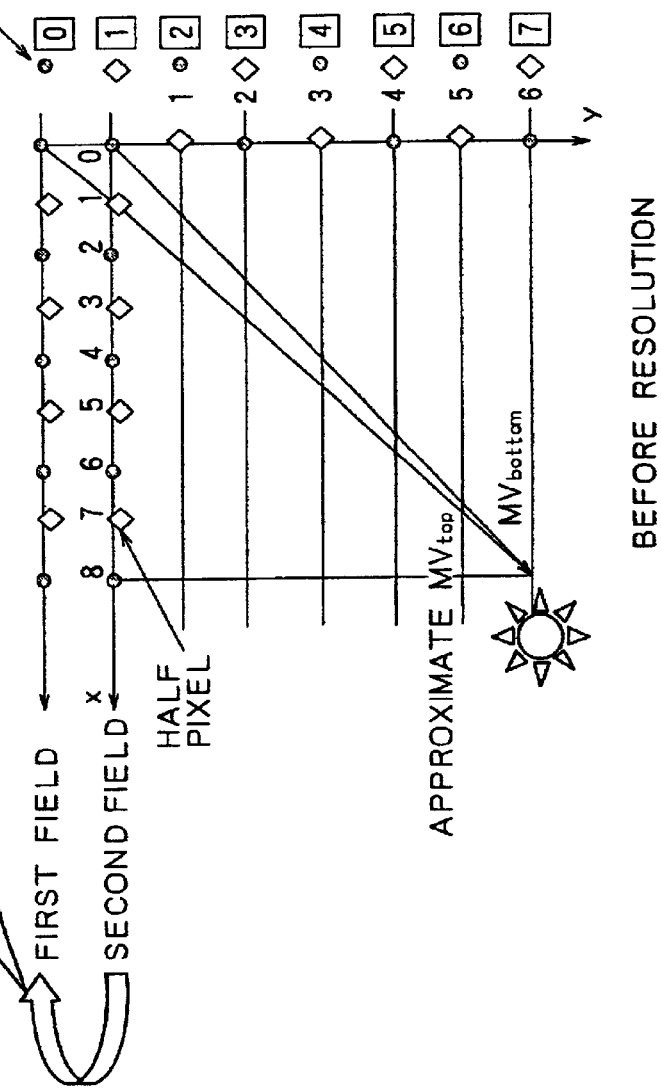

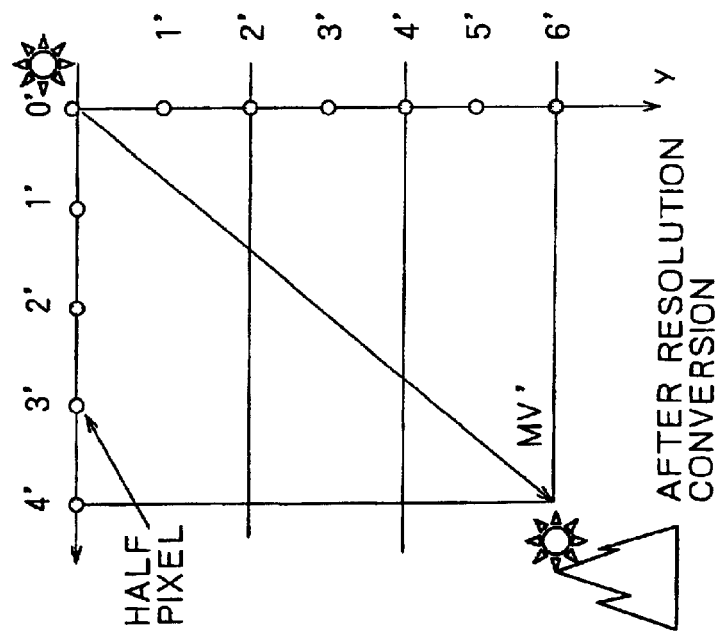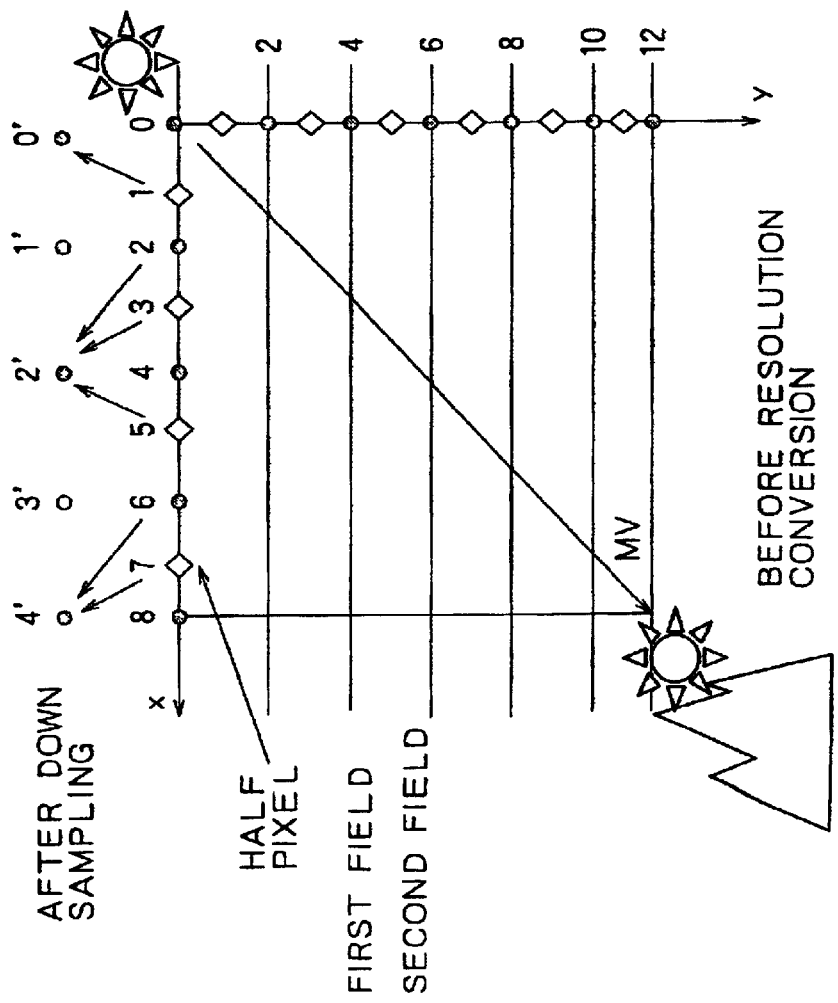

FIG. 18

| REMAINDER WHEN MOTION VECTOR MV BEFORE CONVERSION IS DIVIDED BY 4 | 0 | 1 | 2 | 3 |
|---|---|---|---|---|
| MOTION VECTLE AFTER CONVERSION | [MV/2] | [MV/2] | [MV/2]+1 | [MV/2] |

[MV/2] REPRESENTS INTEGER PART WHEN MV IS DIVIDED BY 2

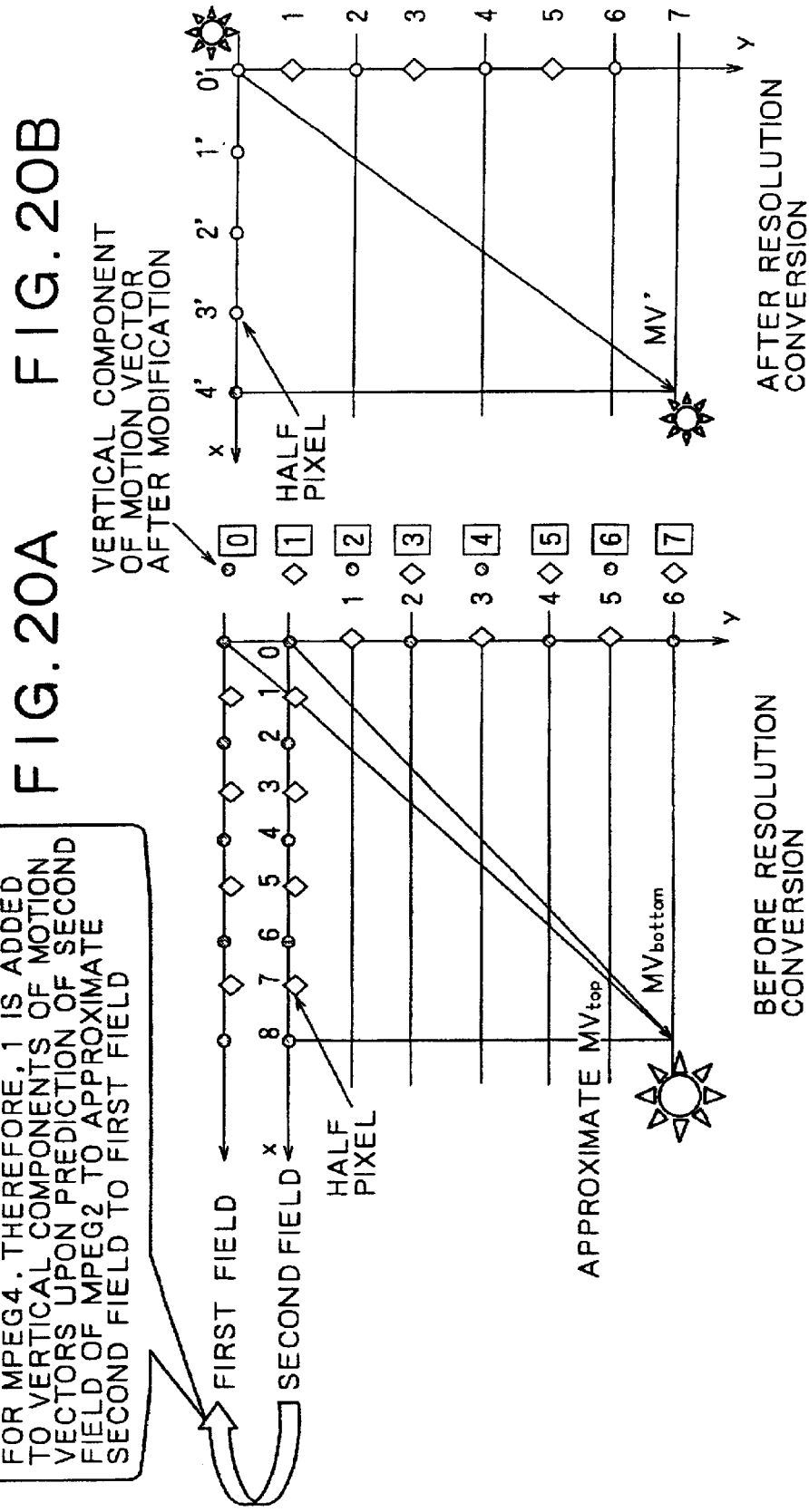

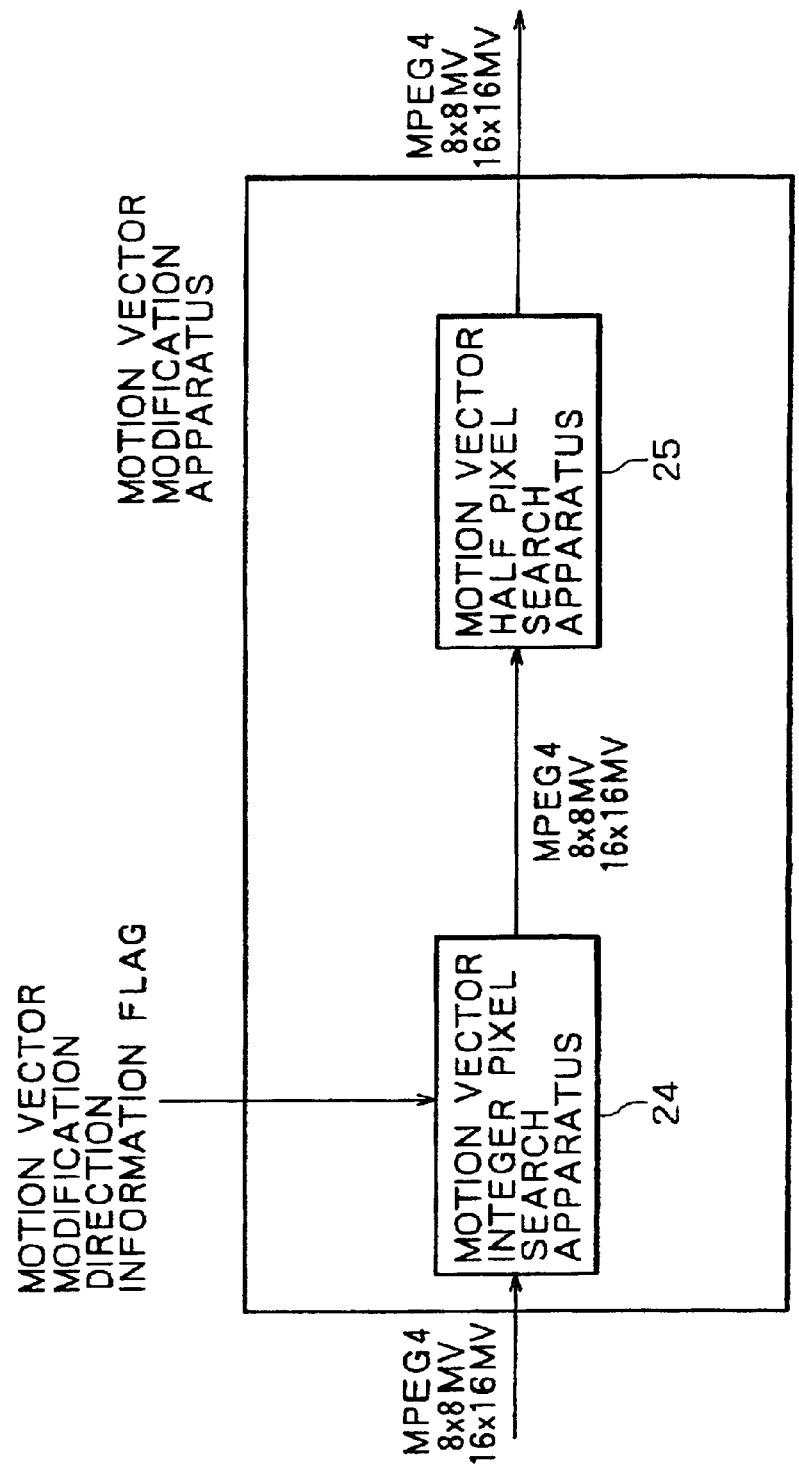

MODIFICATION FROM MPEG2 INTEGER PIXEL TO MPEG4

MODIFICATION FROM MPEG2 INTEGER PIXEL TO MPEG4 INTEGER PIXEL OF FORWARD DIRECTION

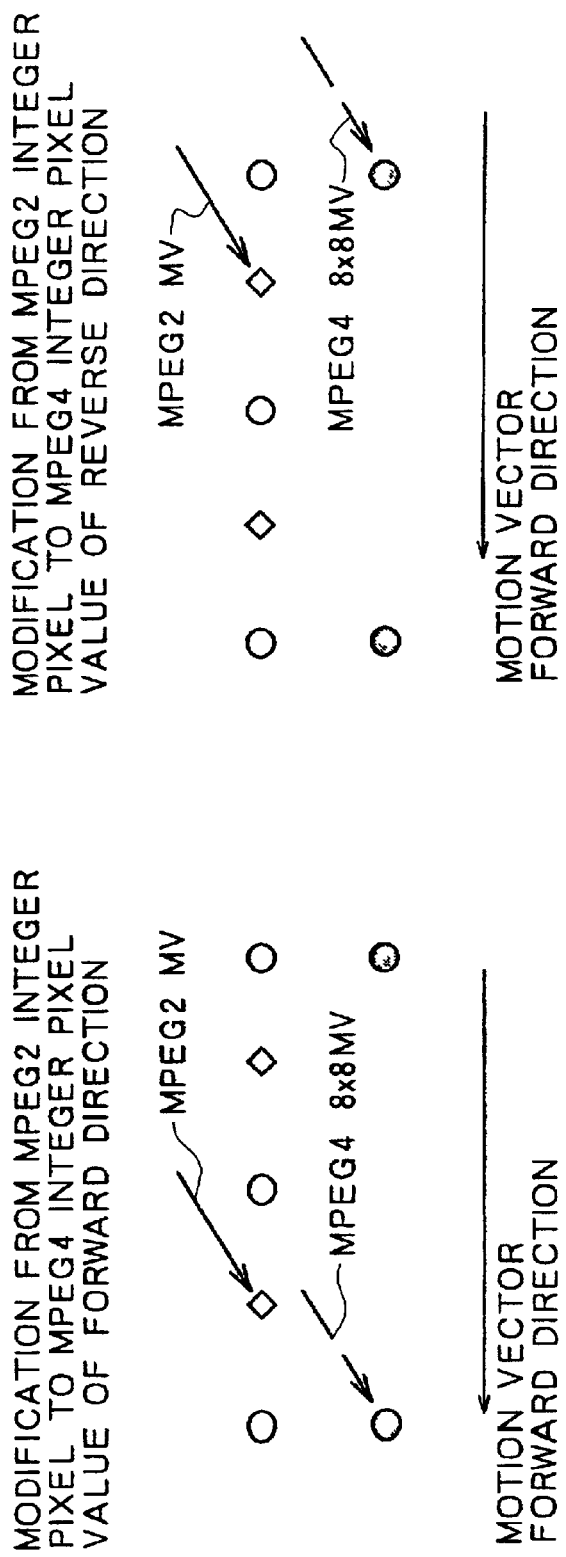

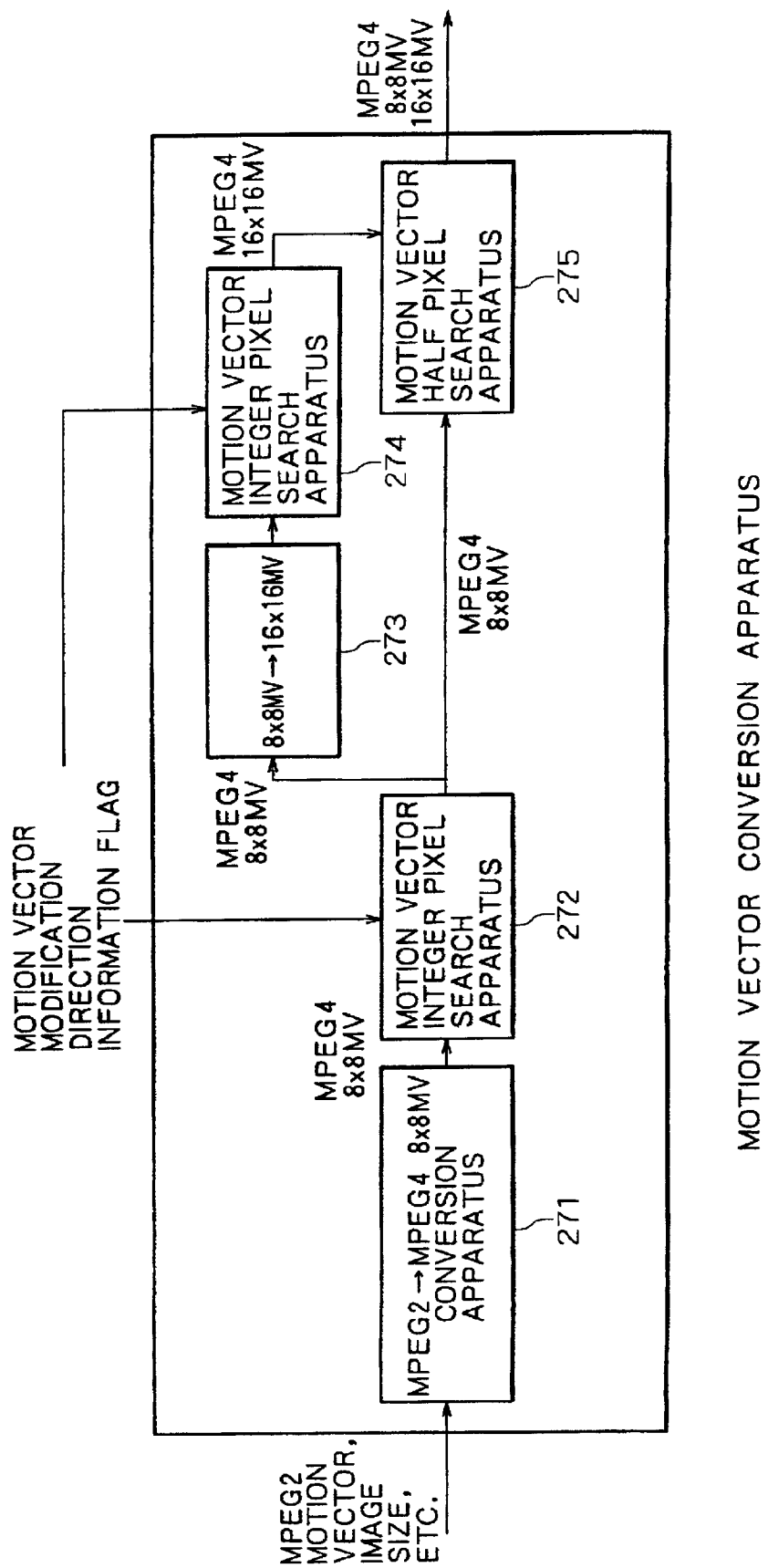

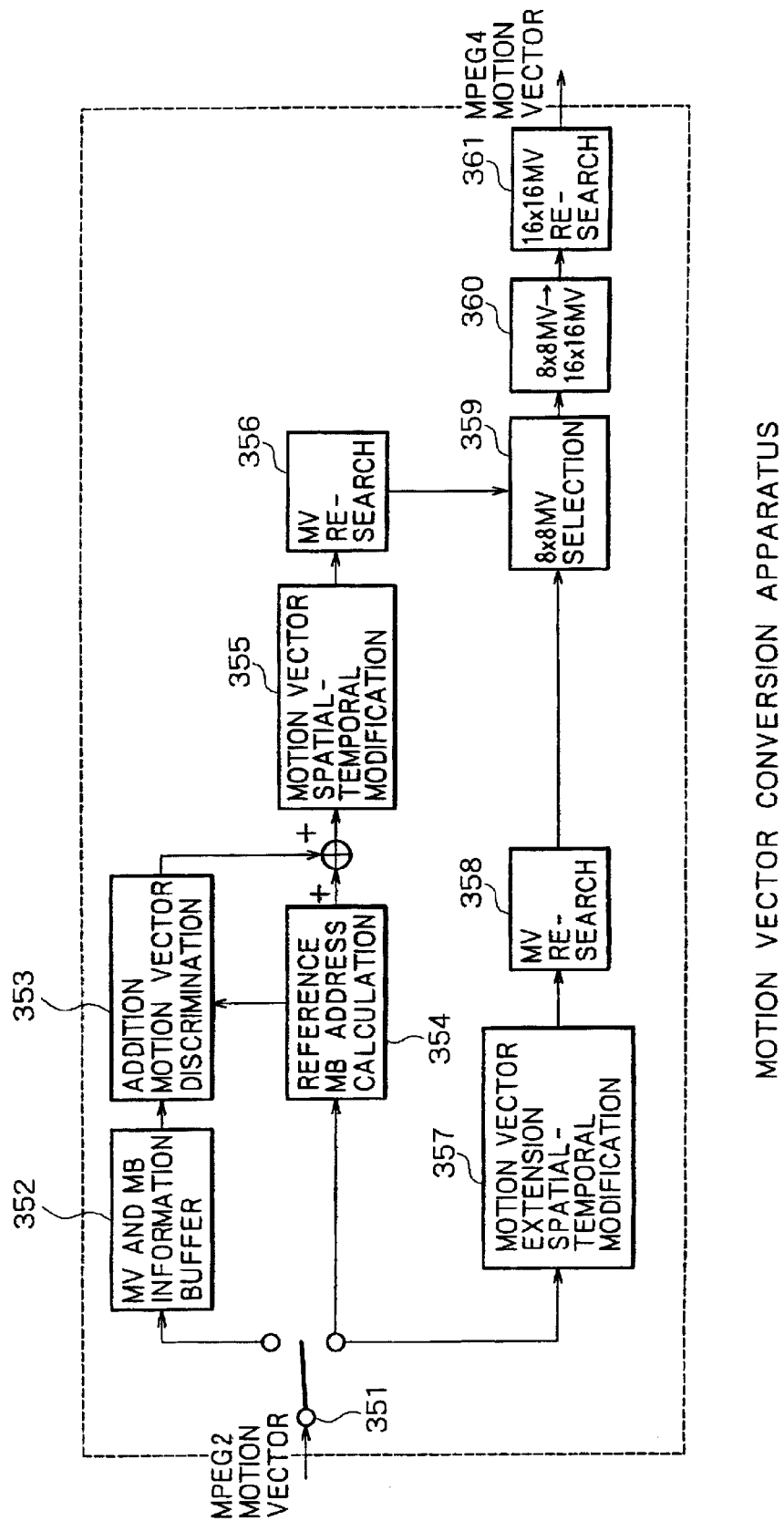

ated to concurrently filed U.S. Patent Applications by Takahashi, et al. entitled "Motion Vector Conversion Method and Conversion Apparatus", based upon and claims the benefit of priority from the related Japanese Patent Application No. 2000-312309.

MOTION VECTOR CONVERSION METHOD AND CONVERSION APPARATUS

CROSS-REFERENCE TO RELATED APPLICATIONS

This application is based upon and claims the benefit of priority from the related Japanese Patent Application No. 2000-310836, filed Oct. 11, 2000, the entire contents of which are incorporated herein by reference.

The present application also contains the subject matter related to concurrently filed U.S. Patent Applications by Takahashi, et al. entitled "Motion Vector Conversion Method and Conversion Apparatus", based upon and claims the benefit of priority from the related Japanese Patent Application No. 2000-312309.

The related applications are assigned to the same assignee as the present application.

BACKGROUND OF THE INVENTION

This invention relates to a motion vector conversion method and a motion vector conversion apparatus for use with an image information conversion method and an image information conversion apparatus wherein the MPEG system is used to receive, through a satellite broadcast, a cable TV or network media such as the Internet, or process, on such storage media as an optical or magnetic disk or a flash memory, a bit stream representative of image information compressed by orthogonal transform such as discrete cosine transform and motion compensation.

In recent years, an apparatus which complies with the MPEG system wherein image information is treated as digital data and compressed by orthogonal transform such as discrete cosine transform and motion compensation making use of the redundancy unique to the image information in order to transmit and store the information with a high efficiency has been and is being popularized in both of information distribution of broadcasting stations and so forth and information reception in general homes.

Particularly, the MPEG2 (ISO/IEC 13818-2) is defined as a general purpose image coding system and is a standardized system which covers both of interlaced scanned images and progressively scanned images as well as standard resolution images and high resolution images. It is estimated that the MPEG2 is used for a wide variety of applications for professional use and for consumer use also in the future. The use of the compression system of MPEG2 can achieve a high compression ratio and a good picture quality, for example, for both of interlaced scanned images of a standard resolution having 720×480 pixels or interlaced scanned images of a high resolution having 1,920×1,088 pixels at 4 to 8 Mbps by allocating a code rate (bit rate) of 18 to 22 Mbps.

Although MPEG2 is directed principally to high picture quality coding suitable for broadcasting but is not ready for a lower code rate (bit rate) than that of MPEG1, that is, not ready for a coding system of a higher compression ratio. It is considered that the need for such a coding system as just described increases in the future a popularization of portable terminals proceeds. In order to cope with the need, standardization of the MPEG4 coding system has been performed. The standards for the MPEG4 image coding system have been approved as international standards as ISO/IEC 14496-2 in December 1998.

Meanwhile, it is requested to convert a bit stream which represents image compression information of MPEG2 coded once for digital broadcasting into another bit stream representative of image compression information OF mpeg4 of a lower code rate (bit rate) which is more suitable for processing on a portable terminal or the like.

An example of a related art image information conversion apparatus which satisfies the request is shown in FIG. 1. Referring to FIG. 1, the image information conversion apparatus shown converts a bit stream representative of image compression information of MPEG2 inputted thereto into another bit stream representative of image compression information of MPEG4. In particular, the inputted bit stream representative of image compression information of MPEG2 is decoded by an MPEG2 image information decoding apparatus 1. The decoded image signal is transmitted to a resolution frame rate conversion apparatus 2, by which it is converted into an image signal having an arbitrary different resolution and frame rate. The image signal obtained by the conversion is inputted to an MPEG4 image information coding apparatus 3, by which it is coded into and outputted as a bit stream representative of image compression information of MPEG4.

In the related art image information conversion apparatus, as seen in FIG. 1, the image signal decoded in accordance with the MPEG2 decoding system is coded by the MPEG4 image information coding apparatus, and a bit stream representative of image compression information of MPEG4 is outputted. The MPEG2 image information decoding apparatus 1 may be configured such that it performs a decoding process for both of horizontal and vertical direction components using all eighth order DCT (discrete cosine transform) coefficients of the bit stream representative of the inputted image compression information of MPEG2. However, the MPEG2 image information decoding apparatus 1 may be configured otherwise such that it performs a decoding process wherein all of eighth order coefficients in the vertical direction are used but only four lower frequency ones of eighth order coefficients in the horizontal direction are used (the decoding process is hereinafter referred to as 4×8 down decoding) or another decoding process wherein only four lower frequency ones of eighth order coefficients in both of the horizontal direction and the vertical directions are used (the decoding process is hereinafter referred to as 4×4 down decoding) in order to reduce the arithmetic operation amount and the video memory capacity and simplify down sampling processing in the following stage while suppressing the picture quality deterioration to the minimum.

According to such a related art method as described above, when the MPEG4 image information coding apparatus codes an image signal inputted thereto, the arithmetic operation processing amount for detecting a motion vector occupies approximately 60 to 70% of the total arithmetic operation processing amount. This gives rise to such problems that real time processing of an image becomes difficult, that a time delay occurs and that a large apparatus scale is required.

As a countermeasure for solving such problems as just described, the inventors have proposed an image information conversion apparatus shown in FIG. 2. Particularly, the inventors have filed the following applications for patent in Japan relating to the image conversion apparatus shown in FIG. 2.

Japanese Patent Application No. 2000-129002 "Motion Vector Conversion Apparatus and Method": This application discloses a technique wherein information of each of macro blocks of MPEG2 is used to select an motion vector of MPEG 2 of that one of macro blocks of MPEG2 which exhibits the highest coding efficiency to produce a motion vector of MPEG4.

Japanese Patent Application No. 2000-132915 "Motion Vector Conversion Apparatus and Method": This application discloses a technique wherein information of each of macro blocks is used to select, based on lengths of motion vectors, a motion vector of MPEG2 of that one of macro blocks of MPEG2 which exhibits the highest coding efficiency to produce a motion vector of MPEG4.

Japanese Patent Application No. 2000-191616 "Motion Vector Conversion Apparatus and Method": This application discloses a technique wherein information of each of macro blocks is used to produce a P-VOP motion vector for an intra-macro block of MPEG2.

FIGS. 3A and 3B illustrate a correlation between a motion vector in a bit stream representative of image compression information of MPEG2 and a motion vector in a bit stream representative of image compression information of MPEG4 and particularly show images of a current frame before and after resolution conversion, respectively. When the resolution of an image is converted, a horizontal component of a motion vector from the position in the preceding frame to a position in the current frame after the conversion can be determined from a horizontal component of a motion vector before the resolution conversion and the resolution conversion rate in the horizontal direction of the image. A vertical component of the motion vector after the resolution conversion can be determined from a vertical component of a motion vector before the resolution conversion and the resolution conversion rate in the vertical direction of the image. In other words, the motion vector before the resolution conversion and the motion vector after the conversion have a high correlation. The correlation can be utilized to determine the motion vector after the resolution conversion from the motion vector before the resolution conversion.

In particular, the image information conversion apparatus of FIG. 2 simply converts a motion vector in a bit stream representative of image compression information of MPEG2 inputted thereto into a motion vector of MPEG4 making use of parameters such as a motion vector of a macro block of MPEG2 and a macro block type. In an MPEG4 image information coding apparatus 7, detection of a motion vector is not performed, but image coding using motion vectors obtained by conversion is performed. As a result, the MPEG4 image information coding apparatus 7 does not perform motion detection, and consequently, the processing amount is reduced significantly.

By performing conversion from a motion vector of MPEG2 into a motion vector of MPEG4 and adopting a parameter used for decoding of MPEG2 or a parameter after conversion in addition to a motion vector in this manner, the processing amount of the MPEG4 image information coding apparatus 7 can be reduced. Consequently, the time delay by the MPEG4 image information coding apparatus 7 can be reduced.

The bit stream representative of the inputted image compression information of MPEG2 illustrated in FIGS. 3A and 3B undergoes decoding processing by an MPEG2 image information decoding apparatus 4 of FIG. 2, and a bit stream representative of image compression information of MPEG4 is outputted. The MPEG2 image information decoding apparatus 4 may be configured such that it performs a decoding process for both of horizontal and vertical direction components using all eighth order DCT coefficients of the bit stream representative of the inputted image compression information of MPEG2. However, the MPEG2 image information decoding apparatus 4 may be configured otherwise such that it performs 4×8 down decoding or 4×4 down decoding in order to reduce the arithmetic operation amount and the video memory capacity and simplify down sampling processing in the following stage while suppressing the picture quality deterioration to the minimum. The image signal outputted from the MPEG2 image information decoding apparatus 4 is sent to a resolution frame rate conversion apparatus 5, in which resolution and frame rate conversion are performed and then an image signal having a resolution suitable for image coding of MPEG4 is produced with an image size adjustment flag inputted thereto from the outside. The thus produced image signal is outputted from the resolution frame rate conversion apparatus 5.

More particularly, the resolution frame rate conversion apparatus 5 first performs resolution conversion of the image signal inputted thereto from the MPEG2 image information decoding apparatus 4 by means of a resolution frame converter. Here, an example of resolution conversion wherein the resolution is reduced to ½ for both of the vertical and horizontal directions is described. As seen in FIG. 4, in the down sampling in the vertical direction, first fields or second fields of inputted interlaced scanned images are extracted to convert the images into progressively scanned images. In the down sampling in the horizontal direction, a down sampling filter is used to convert each image into an image of a ½ resolution. Further, in order to achieve a low bit rate, not only compression by resolution conversion is performed, but also first fields or second fields only of I/P pictures are extracted to lower the frame rate in the temporal direction. For example, I, B, B and P pictures of MPEG2 shown in FIG. 4 are converted into the first fields of the I and P pictures by resolution and frame rate conversion. The images obtained by the resolution and frame conversion include a number of pixels arranged in numbers of rows and columns equal to multiples of 16 so that they can be coded in accordance with a picture coding method of MPEG4. To this end, a circuit for supplementing or removing pixels is employed to supplement or remove pixels in accordance with an image size adjustment flag inputted from the outside.

The image size adjustment flag is inputted from the outside of the resolution frame rate conversion apparatus 5 and is used for discrimination of whether pixels should be supplemented to or removed from an image when the pixel number in the rows or columns of the image is not a multiple of 16.

A process for an image with the image size adjustment flag is described with reference to FIG. 5. If it is assumed that the resolution of an image outputted from the MPEG2 image information decoding apparatus 4 is m×n pixels, then while both of m and n are multiples of 16, m/2 and n/2 by down sampling to ½ in the vertical and horizontal directions are multiples of 16 or have the remainder of 8 pixels when they are divided by 16. Where both of m/2 and n/2 are multiples of 16, the image complies with the MPEG4 coding system, and therefore, no processing is performed for the image. In any other case, the image does not comply with the MPEG4 coding system, and therefore, it is necessary to process the image with the image size adjustment flag. The image size adjustment flag provides two choices of supplementation and removal of pixels. When m/2 or n/2 is divided by 16, if the remainder is 8 pixels, then if removal of pixels is selected, then the remaining 8 pixels are removed. In other words, the resulting output image has (m/2−8) or (n/2−8) rows or columns. On the other hand, if supplementation of pixels is selected, then 8 pixels produced newly, 8 pixels copied from the original image or 8 pixels suitable for the image are added to the top or the bottom of the rows or columns of the image. Therefore, the output image has (m/2+8) or (n/2+8) rows or columns. As a result, the horizontal and vertical resolutions of the image after the conversion become multiples of 16, and an image having a size compliant with the coding system of MPEG4 is outputted.

Referring back to FIG. 2, the inputted bit stream representative of image compression information of MPEG2 undergoes variable length decoding by the MPEG2 image information decoding apparatus 4. Further, macro block motion vectors only of P pictures and other parameters such as the macro block type are extracted from the bit stream by the MPEG2 image information decoding apparatus 4 and transmitted to a motion vector conversion apparatus 6.

A motion vector conversion method by the motion vector conversion apparatus 6 is described with reference to FIGS. 6A and 6B. Each of squares defined by solid horizontal and vertical lines in FIGS. 6A and 6B indicates a macro block. FIG. 6A shows an image outputted from the MPEG2 image information decoding apparatus 4, that is, an image before resolution conversion. FIG. 6B shows an image obtained by converting the vertical and horizontal resolutions of the image of FIG. 6A into ½ by means of the resolution frame rate conversion apparatus 5. For example, a macro block of 16×16 pixels (hereinafter referred to as 16×16 macro block) indicated with slanting lines at the left top corner of the image of FIG. 6A before the conversion is converted into a block of 8×8 pixels (hereinafter referred to as 8×8 block) indicated with slanting lines at the left top corner of the image of FIG. 6B. Further, four 16×16 macro blocks screened in FIG. 6A are individually converted, by resolution conversion, into four 8×8 blocks as screened in FIG. 6B, and one 16×16 macro block is formed from the four 8×8 macro blocks. Since the correlation between motion vectors before and after the resolution conversion is high, a motion vector of an 8×8 block after the conversion can be determined from a motion vector of a 16×16 macro block before the conversion. Further, a 16×16 motion block is determined from four 8×8 motion vectors. Consequently, four 8×8 motion vectors and one 16×16 motion vectors for use for coding in accordance with the image coding system of MPEG4 are produced.

A principle of operation of motion vector conversion is described with reference to FIG. 7 which shows a detailed configuration of the motion vector conversion apparatus 6 of the image information conversion apparatus of FIG. 2. Such parameters as a motion vector and an image size in the inputted bit stream representative of image compression information of MPEG2 are used to produce an 8×8 motion vector before modification by an MPEG2 16×16 motion vector to 8×8 motion vector conversion apparatus 8.

A principle of operation of the MPEG2 16×16 motion vector to 8×8 motion vector conversion apparatus 8 is described with reference to a flow chart of FIG. 8. The MPEG2 16×16 motion vector to 8×8 motion vector conversion apparatus 8 operates in the following manner based on a motion vector and a macro block type of an inputted macro block of MPEG2. Since a bit stream of interlaced scanned image compression information of MPEG2 usually uses a frame structure, a conversion method which only includes processing of a bit stream of a frame structure is described here.

In step ST-1, the MPEG2 16×16 motion vector to 8×8 motion vector conversion apparatus 8 discriminates, based on the motion vector and the macro block type of the inputted macro block of MPEG2, which one of an intra-macro block, a skip macro block and an inter-macro block the macro block is. If the macro block is an intra-macro block, then it is assumed that an 8×8 block after resolution conversion of the intra-macro block of MPEG2 has a motion vector. As processing for the intra-macro block of MPEG2, in step ST-2, the motion vector of the 8×8 block is set to 0 first, and then an intra-mode flag is provided in order to allow processing by a MPEG2 intra-macro block motion vector modifier 11 to be performed. In MPEG2, when the macro block is an intra-macro block, an intra-mode flag is set.

If the macro block otherwise is a skip macro block, then the motion vector of each block is set to 0.

A concept of motion vector conversion where the macro block is an inter-macro block and the image has a frame structure and frame prediction is used is described with reference to FIGS. 9A and 9B. FIG. 9A shows an image before resolution conversion while FIG. 9B shows the image after the resolution conversion. As described hereinabove with reference to FIGS. 3A and 3B, a horizontal component of a motion vector after conversion is determined from a horizontal component of a motion vector before the conversion and a resolution conversion rate in the horizontal direction of the image. A vertical component of the motion vector is determined from a vertical component of the motion vector before the conversion and a resolution conversion rate in the vertical direction of the image. In particular, when the resolution in the horizontal direction is converted into ½, also the horizontal component of the motion vector after the conversion becomes ½ that before the conversion. When the resolution in the vertical direction is converted into ½, also the vertical component of the motion vector after the conversion becomes ½ that before the conversion.

The motion vector (8, 12) before conversion illustrated in FIG. 9A changes to a motion vector (4, 6) after the conversion illustrated in FIG. 9B. It is to be noted that, in FIGS. 9A and 9B, the distance between middle values (half pixels) of integer pixels is represented by 1. In the image before the resolution conversion shown in FIG. 9A, each dark circle indicates the position of an integer pixel, and each rhomb indicates the position of a half pixel. In the image after the resolution conversion shown in FIG. 9B, a half pixel is indicated by a blank circle. As can be seen from FIGS. 9A and 9B, a motion vector indicated at the position of an integer pixel before conversion is indicated at the position of an integer pixel or a half pixel after the conversion, but a motion vector indicated at the position of a half pixel before the conversion does not have a pixel referred to thereby after the resolution conversion. Therefore, if a motion vector before conversion indicates the position of a half pixel, then also the motion vector after conversion is changed so as to indicate the position of a half pixel of a predictive image. Since a decoded image signal originally includes some distortion arising from quantization, if it is used as it is as a predictive image, then the prediction efficiency is deteriorated and may sometimes cause picture quality deterioration. In order to reduce such prediction efficiency deterioration, a half pixel accuracy wherein pixels on a reference screen which corresponds to a low-pass filter are linearly interpolated at 1:1 is sometimes selected so that the picture quality deterioration may be prevented. Accordingly, also in coding in accordance with the image coding system of MPEG4, in order to augment the prediction efficiency and prevent the picture quality deterioration, if a motion vector of MPEG4 indicates the position of a half pixel, then also upon conversion into a format of MPEG4, it is converted so that the motion vector may indicate the position of a half pixel. A corresponding relationship between motion vectors before and after conversion is illustrated in a table of FIG. 10.

FIGS. 11A and 11A illustrate a concept of motion vector conversion where an image has a frame structure and field prediction, particularly first field prediction, is used. A horizontal component of a motion vector is processed in a similar manner as in the image of FIGS. 10A and 10B. For the vertical direction, the first fields are extracted to allow conversion of the resolution into ½. Since also the prediction used is the first field prediction, a motion vector before conversion becomes a motion vector after the conversion as it is.

A concept of motion vector conversion where an image has a frame structure and second field prediction is used is illustrated in FIGS. 12A, 12B and 13. When resolution conversion is performed, since only the first field is extracted, pixel values of the first field are used as a reference image after conversion. Therefore, temporal and spatial modification of a motion vector is performed so that pixel values of the second field used as a predictive picture in MPEG2 are used for first field prediction after resolution conversion. FIGS. 12A and 12B illustrate a technique of spatial modification used to convert pixel values of second field prediction approximately into pixel values of first field prediction. FIG. 12A illustrates a motion vector before resolution conversion while FIG. 12B illustrates a motion vector after the resolution conversion. In particular, "1" is added to a vertical component of a motion vector. As can be seen from FIGS. 12A and 12B, if "1" is added to a vertical component of a motion vector determined by second field prediction, then the second field is shifted by one row distance so that it comes to a spatial position similar to that of the first field and the motion vector becomes a motion vector like a motion vector determined by first field prediction in the space. The expression (1) given below represents a vertical component of a motion vector $MV_{top}$ where the second field at a spatial position positioned at a similar position to that of the first field by spatial modification, that is, an approximate first field, is used for prediction:

Vertical component: approximate $MV_{top}=MV_{bottom}+1$ (1)

Meanwhile, interlaced scanned image compression information of MPEG2 exhibits some displacement in time between the first field and the second field. Therefore, modification for the time displacement between the first field approximated from the second field and the actual first field is performed. FIG. 13 illustrates a temporal positional relationship of different fields. Here, if the interval between the first field and the second field is represented by 1 and the interval between the second field of an I picture and the first field of a P picture is represented by $a$, then the value $a$ exhibits an odd number like 1, 3, 5, 7, . . . It is to be noted that, where $a$ is 1, pictures are I, P, P, P, . . . pictures. A time modified motion vector MV' is given by the following expression (2):

Vertical component: $MV'=\{(a+1)/a\}$approximate $MV_{top}$ (2)

By substituting the expression (1) into the expression (2), the vertical component of the motion vector after the conversion is given by the following expression (3):

Vertical component: $MV'=\{(a+1)/a\}(MV_{bottom}+1)$ (3)

It is to be noted that the horizontal component of the motion vector after the conversion can be determined by multiplying the motion vector before the conversion by $(a+1)/a$, performing temporal modification and then performing the calculation illustrated in the table of FIG. 10.

Spatial modification may be performed for the vertical component of the motion vector after the temporal modification is performed, if needed. The vertical component of the motion vector MV' in this instance is given by the expression (4) given below. It is to be noted that, if spatial and temporal modification is performed for the horizontal component (time modification is performed after spatial modification is performed), then the horizontal component exhibits a similar value to that obtained when temporal and spatial modification is performed (spatial modification is performed after temporal modification is performed).

Vertical component: $MV'=\{(a+a)/1\}MV_{bottom}+1$ (4)

The difference between the expression (3) and the expression (4), that is, the difference between the vertical components of the motion vector when spatial and temporal modification is performed and when temporal and spatial modification is performed, is 1/a. Accordingly, since the influence of the difference differs depending upon the value of $a$, modification methods in two cases wherein $a$ is equal 1 and wherein $a$ is 3, 5, 7, . . . are described.

First, a modification method where a=1 is described. By substituting 1 into $a$ of the expression (3) the vertical component of the motion vector is determined as given by the following expression (5):

Vertical component: $MV'=2\times(MV_{bottom}+1)$ (5)

By substituting 1 into $a$ of the expression (4), the vertical component of the motion vector is determined as given by the following expression (6):

Vertical component: $MV'=2\times(MV_{bottom}-1)$ (6)

As a result, if 0, 1, 2, . . . are substituted into the motion vector $MV_{bottom}$ before the conversion, then such even numbers as 2, 4, 6, . . . are obtained as the value according to the expression (5). On the other hand, such odd numbers as 1, 3, 5, . . . are obtained as the value according to the expression (6). In other words, if spatial and temporal modification is performed, then irrespective of whether the motion vector before the conversion is indicated at the position of an integer pixel or at the position of a half pixel, the motion vector after the conversion comes to the position of a half pixel. Accordingly, in order to cause a motion vector, which is indicated at the position of an integer pixel before conversion, to come to the position of an integer pixel also after the conversion, spatial and temporal conversion is performed. On the other hand, in order to cause a motion vector, which is indicated at the position of a half pixel before conversion, to come to the position of a half pixel also after the conversion, temporal and spatial conversion is performed. In short, spatial modification and temporal modification are used alternately for motion vectors before conversion to convert them into motion vectors after the resolution conversion or to perform temporal and spatial modification for the motion vectors before the conversion.

After the motion vector conversion process described above comes to an end, an 8×8 motion vector of MPEG4 before modification is outputted. The 8×8 motion vector outputted is transmitted to an image size adjustment flag based motion vector adjuster 9 (FIG. 7), by which it is modified with an image size adjustment flag inputted thereto from the outside to a motion vector suitable for an image size. The resulting motion vector is outputted from the image size adjustment flag based motion vector adjuster 9.

Operation of the image size adjustment flag based motion vector adjuster 9 is described with reference to a flow chart of FIG. 14. In step ST-11, the image size adjustment flag based motion vector adjuster 9 discriminates whether or not both of m/2 and n/2 where the input image has a size of m×n pixels are multiples of 16. If both of m/2 and n/2 are multiples of 16, then the image size adjustment flag based motion vector adjuster 9 outputs the 8×8 motion vector of MPEG4 outputted from the motion vector conversion apparatus 6 as it is without processing the same. If m/2 or n/2 is not a multiple of 16, the image size adjustment flag based motion vector adjuster 9 uses the image size adjustment flag inputted from the outside to discriminate whether or not pixels should be removed in step ST-12. If pixels should be removed, then the image size adjustment flag based motion vector adjuster 9 does not output the 8×8 motion vector of the eight pixels removed but outputs another 8×8 motion vector. If it is discriminated in step ST-12 that pixels should not be removed, then the image size adjustment flag based motion vector adjuster 9 discriminates in step ST-13 whether or not pixels should be supplemented. If pixels should be supplemented, then the image size adjustment flag based motion vector adjuster 9 sets an 8×8 motion vector of eight pixels supplemented to 0 and outputs the motion vector of 0 together with the other inputted 8×8 motion vectors.

Referring back to FIG. 7 again, the 8×8 motion vector outputted from the image size adjustment flag based motion vector adjuster 9 and suitable for the image size is converted by an MPEG4 8×8 motion vector to MPEG4 16×16 motion vector conversion apparatus 10 or an MPEG4 8×8 motion vector to MPEG4 16×16 motion vector conversion apparatus 15 shown in FIG. 16.

The motion vector conversion apparatus 10 of FIG. 7 divides the sum of motion vectors of those of four blocks cooperatively forming a macro block which are converted from a macro block which is not an intra-macro block b the number of those blocks to calculate an average motion vector and outputs the average motion vector as a 16×16 motion vector.

This is described with reference to FIG. 16. As a first method, the MPEG4 8×8 motion vector to MPEG4 16×16 motion vector conversion apparatus 15 selects, from among 8×8 motion vectors of MPEG4 for the macro block produced by an MPEG2 16×16 motion vector to MPEG4 8×8 motion vector conversion apparatus 12, the motion vector produced from that one of the pertaining macro blocks which is considered to have the highest coding efficient, and outputs the selected motion vector as a 16×16 motion vector of MPEG4.

The discrimination of the coding efficiency is performed based on information of the individual macro blocks stored in a macro block information buffer 14 and representative of image compression information of MPEG2 inputted to the image information conversion apparatus.

In short, the first method determines that one of four macro blocks which includes the least number of non-zero DCT coefficients has the highest coding efficiency. A second method determines that one of four macro blocks which includes the least number of bits allocated to DCT coefficients of brightness components has the highest coding efficiency. A third method determines that one of four macro blocks which includes the least number of bits allocated to DCT coefficients has the highest coding efficiency. A fourth method determines that one of four macro blocks which includes the least total number of bits allocated to the macro block including motion vectors and so forth has the highest coding efficiency. A fifth method determines that one of four macro blocks which has the smallest allocated quantization scale has the highest coding efficiency. A fifth method determines that one of four macro blocks which has the lowest complexity has the lowest coding efficiency. The complexity X allocated to each macro block is calculated in accordance with the following expression (7) using the quantization scale Q allocated to the macro block and the bit number B of the macro block:

$$X = Q^2 B \qquad (7)$$

where B may be the bit number allocated to the entire macro block, or may be the bit number allocated to DCT coefficients or else may be the bit number allocated to DCT coefficients allocated to brightness components.

Referring back to FIG. 16, as the second method, the MPEG4 8×8 motion vector to MPEG4 16×16 motion vector conversion apparatus 15 counts, from among 8×8 motion vectors of MPEG4 for the macro blocks produced by the MPEG2 16×16 motion vector to MPEG4 8×8 motion vector conversion apparatus 12, that motion vector produced from the macro block which is considered to have the highest weight twice in an overlapping relationship, and determines that one of the totaling five 8×8 motion vectors which has a length of a middle value has the highest coding efficiency and selects and outputs the 8×8 motion vector as a 16×16 motion vector of MPEG4. Here, for the comparison in length between motion vectors, the sum of the squares of the lengths in the horizontal direction and the vertical direction is used, but a process of determining a square root is omitted.

The discrimination of the weight is performed based on information of the individual macro blocks of the bit stream stored in the macro block information buffer 14 and representative of image compression information of MPEG2 inputted to the image information conversion apparatus.

In particular, a first method determines that one of four macro blocks which includes the least number of non-zero DCT coefficients has the highest weight. A second method determines that one of four macro blocks which includes the least number of bits allocated to DCT coefficients of brightness components has the highest weight. A third method determines that one of four macro blocks which includes the least number of bits allocated to DCT coefficients has the highest weight. A fourth method determines that one of four macro blocks which includes the least total number of bits allocated to the macro block including motion vectors and so forth has the highest weight. A fifth method determines that one of four macro blocks which has the smallest allocated quantization scale has the highest weight. A fifth method determines that one of four macro blocks which has the lowest complexity has the lowest weight. The complexity X allocated to each macro block is calculated in accordance with the following expression (7) using the quantization scale Q allocated to the macro block and the bit number B of the macro block:

$$X = Q^2 B \qquad (8)$$

where B may be the bit number allocated to the entire macro block, or may be the bit number allocated to DCT coefficients or else may be the bit number allocated to DCT coefficients allocated to brightness components.

Referring back to FIG. 7 again, the 8×8 motion vectors suitable for the image size outputted from the image size adjustment flag based motion vector adjuster 9 are inputted to the MPEG2 intra-macro block motion vector modifier 11. The 8×8 motion vector of each block converted from a macro block which has been an intra-macro block in the bit stream representative of image compression information of MPEG2 is modified by being replaced with the 16×16 motion vector determined by the MPEG4 8×8 motion vector to MPEG4 16×16 motion vector conversion apparatus 10. The 8×8 motion vectors after the modification and the 16×16 motion vector determined by the MPEG4 8×8 motion vector to MPEG4 16×16 motion vector conversion apparatus 10 are outputted as MPEG4 motion vectors.

A principle of operation of the motion vector modification is described with reference to FIG. 15 which shows a detailed configuration of the MPEG2 intra-macro block motion vector modifier 11 of FIG. 7. An 8×8 motion vector suitable for an image size is inputted to the MPEG2 intra-macro block motion vector modifier 11. When the intra-mode flag is in a set state, that is, when the macro block is an intra-macro block in the bit stream which represents image compression information of MPEG2, a movable contact m of a switch SW is connected to a fixed contact a side, and the motion vector of the 8×8 block converted from the intra-macro block is replaced by a replacement apparatus PK with the 16×16 motion vector determined by the MPEG4 8×8 motion vector to MPEG4 16×16 motion vector conversion apparatus 10. In this instance, the motion vector of the 8×8 block may alternatively be replaced with a motion vector converted from a motion vector of an inter-macro block present around the intra-macro block, or otherwise may be replaced with a motion vector converted from a motion vector of an inter-macro block which is nearest to the intra-macro block. It is to be noted that, if all of the four blocks are converted from intra-macro blocks, the four motion vectors become 0, and also the 16×16 motion vector determined by the MPEG4 8×8 motion vector to MPEG4 16×16 motion vector conversion apparatus 10 becomes 0. Therefore, the motion vector to be used for image coding of MPEG4 becomes 0, and the macro-block type becomes the intra-mode type. On the other hand, when the intra-mode flag is not in a set state, that is, when no intra-macro block of MPEG2 is involved, the movable contact m of the switch SW is connected to another fixed contact b side, and the 8×8 motion vector inputted is outputted as it is.

Now, a re-search of a produced motion vector is described. A concept of motion vector conversion of an inter-macro block where an image has a frame structure and field prediction is used is illustrated in FIGS. 17A and 17B. FIG. 17A shows a motion vector before resolution conversion while FIG. 17B shows the motion vector after the resolution conversion. As described hereinabove with reference to FIGS. 3A and 3B, the horizontal component of a motion vector after conversion can be determined from the horizontal component of the motion vector before conversion and a resolution conversion rate in the horizontal direction of the image. The vertical component can be determined from the vertical component of the motion vector before the conversion and the resolution conversion rate in the vertical direction of the image. In other words, if the resolution in the horizontal direction is converted into ½, then also the vertical component of the motion vector after the conversion becomes ½ that before the conversion. The motion vector illustrated in FIGS. 9A and 9B changes, for example, from (8, 12) before conversion to (4, 6) after the conversion. It is to be noted that, in this instance, the distance between middle values (half pixels) of integer pixels is represented by 1. Before the resolution conversion of FIG. 17A, each dark circle indicates the position of an integer pixel, and each rhomb indicates the position of a half pixel.

As can be seen from FIGS. 17A and 17B, a motion vector indicated at the position of an integer pixel before the conversion is indicated at the position of an integer pixel or a half pixel after the conversion, but a motion vector indicated at the position of a half pixel before the conversion does not have a pixel to be referred to after the resolution conversion. Therefore, where a motion vector before conversion indicates the position of a half pixel, the motion vector after the conversion is modified so that also it indicates the position of the nearest integer pixel of a predictive image. This is intended to make the center pixel of a search window coincide with an integer pixel when pixels around the motion vector are re-searched in later motion vector modification. First, it is determined that one of motion vectors of integer pixels in a search window which exhibits the smallest prediction error, and then half pixel values around the integer pixel are searched thereby to reduce the number of processing steps. A correspondence relationship between motion vectors before and after conversion is illustrated in FIGS. 19A and 19B.

Alternatively, it is possible to produce a half pixel motion vector and perform a re-search around the half pixel as seen in FIGS. 9A, 9B, 10, 11A, 11B, 12A and 12B. In this instance, however, a step of determining the half pixel value in the search window in advance is required, resulting in increase of the number of processing steps.

Now, a concept of motion vector conversion of an inter-macro block where an image has a frame structure and first field prediction is used as the field prediction is illustrated in FIGS. 19A and 19B. FIG. 19A illustrates a motion vector before resolution conversion while FIG. 19B illustrates the motion vector after the resolution conversion. For the horizontal component of a motion vector, a process similar to that described hereinabove with reference to FIG. 18 is performed. For the vertical component of the motion vector, the first fields are extracted to allow conversion of the resolution into ½. Further, since first field prediction is performed as the prediction, a motion vector before the conversion becomes a motion vector after the conversion as it is.

A concept of motion vector conversion of an inter-macro block where second field prediction is used is illustrated in FIGS. 20A and 20B. FIG. 20A illustrates a motion vector before resolution conversion while FIG. 20B illustrates the motion vector after the resolution conversion. Since only the first fields are extracted upon resolution conversion, after the conversion, pixel values of the first fields are used as reference images. Field line modification and motion vector modification in the temporal direction are performed by a method similar to that described hereinabove with reference to FIGS. 12A and 12B, and thereafter, processing similar to that of FIG. 18 is performed for the pixel values in the horizontal direction as seen from integer pixels after the conversion.

Now, a motion vector modification process by a re-search is described with reference to FIG. 21. In particular, the motion vector modification apparatus receives a motion vector scaled by the motion vector conversion apparatus 6 of FIG. 2 and outputs a motion vector modified through a re-search in order to raise the cording efficiency. Further, the motion vector modification apparatus sets a size of a search window in accordance with a motion vector modification direction information flag. The motion vector modification direction information flag is hereinafter described with reference to FIGS. 23, 24A and 24B.

In particular, the motion vector modification apparatus performs a re-search to modify a distortion caused by scaling of a motion vector by the motion vector conversion apparatus 6 in order to determine a motion vector with a higher degree of accuracy. First, the motion vector modification apparatus performs a motion vector search of ±2 integer pixels in the horizontal direction and ±1 pixel in the vertical direction around an 8×8 motion vector of MPEG4 inputted thereto. Consequently, the search window centered at the motion vector determined by the motion vector conversion apparatus 6 can be suppressed horizontally to 5 pixels and vertically to 3 pixels thereby to reduce the processing number of the motion vector search significantly. Although the search window is set horizontally to 5 pixels and vertically to 3 pixels as just described, the search pixel numbers of the window in the horizontal and vertical directions need not be limited to them and can be selected arbitrarily. In order to reduce the search processing number, a motion vector modification direction information flag hereinafter described may be used to set the size of the search window for modification of a motion vector asymmetrically in the forward and reverse directions.

FIG. 22 shows a configuration of the motion vector conversion apparatus (related art apparatus which is not known when the present application is filed in Japan). The motion vector conversion apparatus is similar to the motion vector conversion apparatus 6 shown in FIG. 2. First, a conversion apparatus 221 performs spatial and temporal modification of a motion vector described hereinabove to produce an 8×8 motion vector. Then, a search apparatus 222 performs a re-search process of an 8×8 motion vector with regard to the 8×8 motion vector as described above. For example, the search apparatus 222 performs a search, for example, with a search window with two integer pixels in the horizontal and vertical directions around the reference destination of the produced 8×8 motion vector. Consequently, the prediction accuracy of the 8×8 motion vector can be improved. Then, prediction errors re-searched individually with regard to the four 8×8 motion vectors which form one macro block and the 8×8 motion vectors for which the re-search process has been performed are inputted to a conversion apparatus 223.

The conversion apparatus 223 discriminates that one of the four 8×8 motion vectors which exhibits the smallest prediction error among the prediction errors determined upon the re-search for an 8×8 motion vector, and allocates the discriminated motion vector to a 16×16 motion vector. Then, a search apparatus 224 performs a re-search process for the produced 16×16 motion vector in a similar manner as described above to improve the prediction accuracy of the 16×16 motion vector. Thus, the 8×8 motion vectors and the 16×16 motion vector of MPEG4 are produced and outputted.

The 8×8 motion vectors and the 16×16 motion vector outputted are inputted to a half pixel search apparatus 225, from which 8×8 and 16×16 motion vectors of the half pixel accuracy are outputted.

Here, the motion vector modification direction information flag mentioned hereinabove with reference to FIGS. 21 and 22 is described with reference to FIGS. 23A, 23B and 24. The motion vector modification apparatus sets a size of a re-search window in the advancing direction of a motion vector with the motion vector modification direction information flag. First, if the MPEG2 motion vector before conversion is an integer pixel and also the MPEG4 motion vector after conversion has an integer pixel value as seen in FIG. 23A, since a pixel of the same phase is present and no distortion occurs with the pixel value of the motion vector, a search window for motion vector modification is set symmetrically in the advancing direction of the motion vector. However, if the MPEG2 motion vector before conversion has an integer pixel value and the MPEG4 motion vector after the conversion has a half pixel accuracy as seen in FIG. 23B, in order to modify it to an approximate integer pixel value of MPEG4 by carrying up in the advancing direction of the motion vector, the search window is set so as to have a greater part in the reverse direction to the advancing direction of the motion vector thereby to reduce the search processing number. For example, a search is performed with two integer pixel values in the reverse direction to the motion vector and with one integer pixel value in the forward direction. Naturally, if the motion vector of MPEG4 is set to an appropriate integer pixel value of MPEG4 by carrying down upon motion vector conversion, then the search window is set so as to be greater in the forward direction with respect to the advancing direction of the motion vector.

Also in FIGS. 24A and 24B, the MPEG2 motion vector before conversion exhibits a half pixel accuracy. Upon conversion into an MPEG motion vector, in order to modify the motion vector to the nearest integer pixel value of MPEG4, the search window of the MPEG4 motion vector modification apparatus can be set, based on the direction in which a distortion occurs, so as to be greater in the forward direction or the reverse direction with respect to the advancing direction of the motion vector similarly as in the case of FIG. 23B. Consequently, in order to reduce the processing number for motion vector re-search, the direction of the distortion of the motion vector is outputted from the motion vector conversion apparatus 6 and inputted to the motion vector modification apparatus, by which a size of a search window optimum to perform a modification search for a motion vector can be set.

The MPEG4 image information coding apparatus 7 receives an output image from the resolution frame rate conversion apparatus 5, performs coding of the output image in accordance with an image coding system of MPEG4 using the motion vector of MPEG4 outputted from the motion vector conversion apparatus 6, and outputs a bit stream representative of image compression information of MPEG4.

In the MPEG2 motion vector to MPEG4 motion vector conversion described above, since only I and P frames are converted, the frame rate of the bit stream of MPEG4 is 10 frames per second. However, in order to produce a low bit stream of MPEG4, the frame rate of 10 frames per second provides a limitation to the cording efficiency and has a problem that the picture quality is deteriorated significantly.

SUMMARY OF THE INVENTION

It is an object of the present invention to provide a motion vector conversion method for an image information conversion method wherein a bit stream representative of interlaced scanned image compression information of MPEG2 is inputted and another bit stream representative of progressively scanned image compression information of MPEG4 is outputted, by which the cording efficiency in image coding of MPEG4 in the image information conversion method can be augmented.

It is another object of the present invention to provide a motion vector conversion apparatus for an image information conversion apparatus wherein a bit stream representative of interlaced scanned image compression information of MPEG2 is inputted and another bit stream representative of progressively scanned image compression information of MPEG4 is outputted, by which the cording efficiency in image coding of MPEG4 in the image information conversion method can be augmented.

In order to attain the objects described above, according to an aspect of the present invention, there is provided a motion vector conversion method for an image information conversion method wherein a bit stream representative of interlaced scanned image compression information of MPEG2 is inputted and a bit stream representative of progressively scanned image compression information of MPEG4 is outputted, comprising the steps of successively accepting 16×16 motion vectors of MPEG2 of the inputted bit stream representative of image compression information of MPEG2, and successively producing 8×8 motion vectors of MPEG4 and 16×16 motion vectors of MPEG4 based on the 16×16 motion vectors of MPEG2 such that every other one of I frames and P frames of the bit stream of MPEG2 is dropped to produce a bit stream of MPEG4 of a reduced frame rate and a low bit rate.

In the motion vector conversion method for an image information conversion method wherein a bit stream representative of interlaced scanned image compression information of MPEG2 is inputted and a bit stream representative of progressively scanned image compression information of MPEG4 is outputted, 16×16 motion vectors of MPEG2 of the inputted bit stream representative of image compression information of MPEG2 are accepted successively, and 8×8 motion vectors of MPEG4 and 16×16 motion vectors of MPEG4 are successively produced based on the 16×16 motion vectors of MPEG2 such that every other one of I frames and P frames of the bit stream of MPEG2 is dropped to produce a bit stream of MPEG4 of a reduced frame rate and a low bit rate. Consequently, the motion vector conversion method can achieve a high coding efficiency in image coding of MPEG4 in the image information conversion method.

According another aspect of the present invention, there is provided a motion vector conversion apparatus for an image information conversion apparatus to which a bit stream representative of interlaced scanned image compression information of MPEG2 is inputted and from which a bit stream representative of progressively scanned image compression information of MPEG4 is outputted, comprising motion vector production means for accepting 16×16 motion vectors of MPEG2 of the inputted bit stream representative of image compression information of MPEG2 and successively producing 8×8 motion vectors of MPEG4 and 16×16 motion vectors of MPEG4, and dropping means for dropping every other one of I frames and P frames of the inputted bit stream of MPEG2 and supplying 16×16 motion vectors of MPEG2 of the remaining I frames and P frames to the motion vector production means so that a bit stream of MPEG4 of a reduced frame rate and a low bit rate may be produced by the motion vector production means.

In the motion vector conversion apparatus for an image information conversion apparatus to which a bit stream representative of interlaced scanned image compression information of MPEG2 is inputted and from which a bit stream representative of progressively scanned image compression information of MPEG4 is outputted, the motion vector production means accepts 16×16 motion vectors of MPEG2 of the inputted bit stream representative of image compression information of MPEG2 and successively produces 8×8 motion vectors of MPEG4 and 16×16 motion vectors of MPEG4. The dropping means drops every other one of I frames and P frames of the inputted bit stream of MPEG2 and supplies 16×16 motion vectors of MPEG2 of the remaining I frames and P frames to the motion vector production means. Therefore, the motion vector production means produces a bit stream of MPEG4 of a reduced frame rate and a low bit rate. Consequently, the motion vector conversion apparatus can achieve a high coding efficiency in image coding of MPEG4 in an image information conversion method.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a related art image information conversion apparatus which converts a bit stream representative of image compression information of MPEG2 into another bit stream representative of image compression information of MPEG4;

FIG. 2 is a block diagram showing an image information conversion apparatus (related art) proposed by the inventors of the present invention which converts a bit stream representative of image compression information of MPEG2 into another bit stream representative of image compression information of MPEG4;

FIGS. 6A and 6B are diagrammatic views illustrating a motion vector conversion method of a motion vector conversion apparatus in the image information conversion apparatus of FIG. 2;

FIGS. 9A and 9B are diagrammatic views illustrating a concept of motion vector conversion of the MPEG2 16×16 motion vector to MPEG4 8×8 motion vector conversion apparatus in the motion vector conversion apparatus of FIG. 7 wherein a frame structure and frame prediction are used;

FIG. 10 is a table illustrating handling after conversion into an MPEG4 8×8 motion vector of a motion vector of a half pixel accuracy in a bit stream representative of image compression information of MPEG2 illustrated in FIG. 9;

FIGS. 11A and 11B are diagrammatic views illustrating motion vector conversion wherein the image illustrated in FIG. 9 has a frame structure and first field prediction is used;

FIGS. 12A and 12B are diagrammatic views illustrating motion vector conversion wherein the image illustrated in FIG. 9 has a frame structure and second field prediction is used;

FIGS. 17A and 17B are diagrammatic views illustrating a concept of motion vector conversion by the MPEG2 16×16 motion vector to MPEG4 8×8 motion vector conversion apparatus, which performs a motion vector re-search, in the motion vector conversion apparatus of FIG. 7 wherein a frame structure and frame prediction are used;

FIG. 18 is a table illustrating handling after conversion into an MPEG4 8×8 motion vector of a motion vector of a half pixel accuracy in a bit stream representative of image compression information of MPEG2 when a motion vector re-search is performed in the motion vector conversion apparatus of FIG. 7;

FIGS. 20A and 20B are diagrammatic views illustrating a concept of motion vector conversion wherein the image when a motion-vector re-search is performed by the motion vector conversion apparatus of FIG. 7 has a frame structure and second field prediction is used;

FIG. 21 is a block diagram showing a motion vector modification apparatus;

FIGS. 24A and 24B are diagrammatic views illustrating a distortion of a motion vector by spatial modification;

FIG. 34 is a block diagram showing a further example of the motion vector conversion apparatus according to the embodiment of the present invention; and FIG. 35 is a block diagram showing a still further example of the motion vector conversion apparatus according to the embodiment of the present invention.

DESCRIPTION OF THE PREFERRED EMBODIMENTS

Figure 3B:
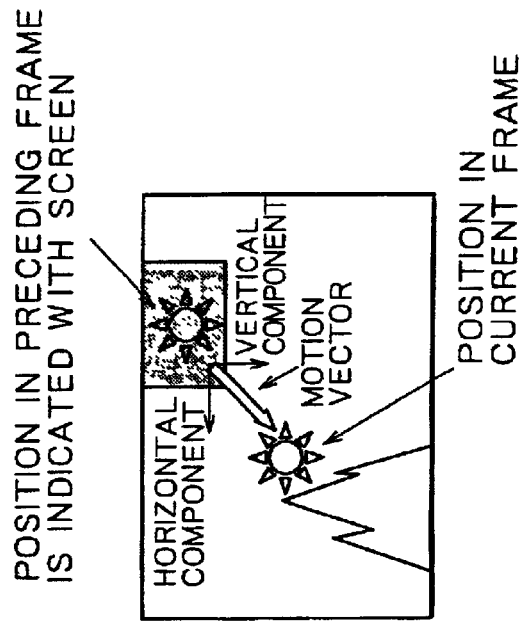
FIGS. 3A and 3B are diagrammatic views illustrating a correlation between a motion vector in a bit stream representative of image compression information of MPEG2 and another motion vector in another bit stream representative of image compression information of MPEG4.
Figure 3A:
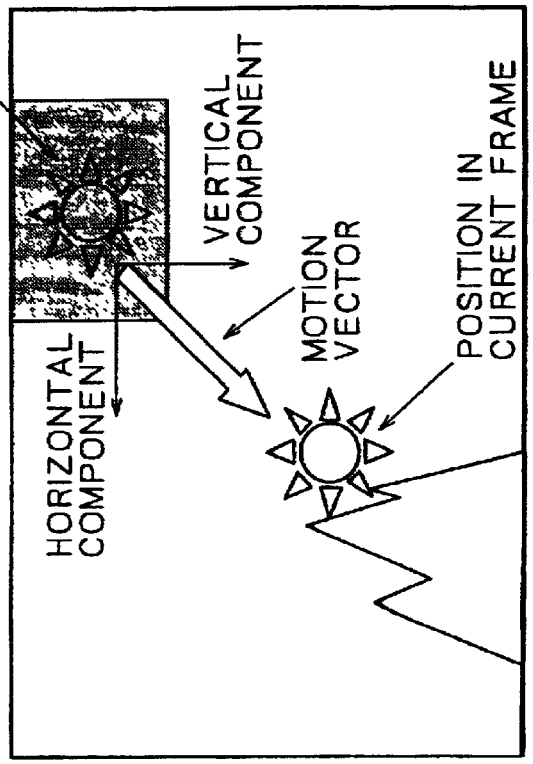
Figure 4:
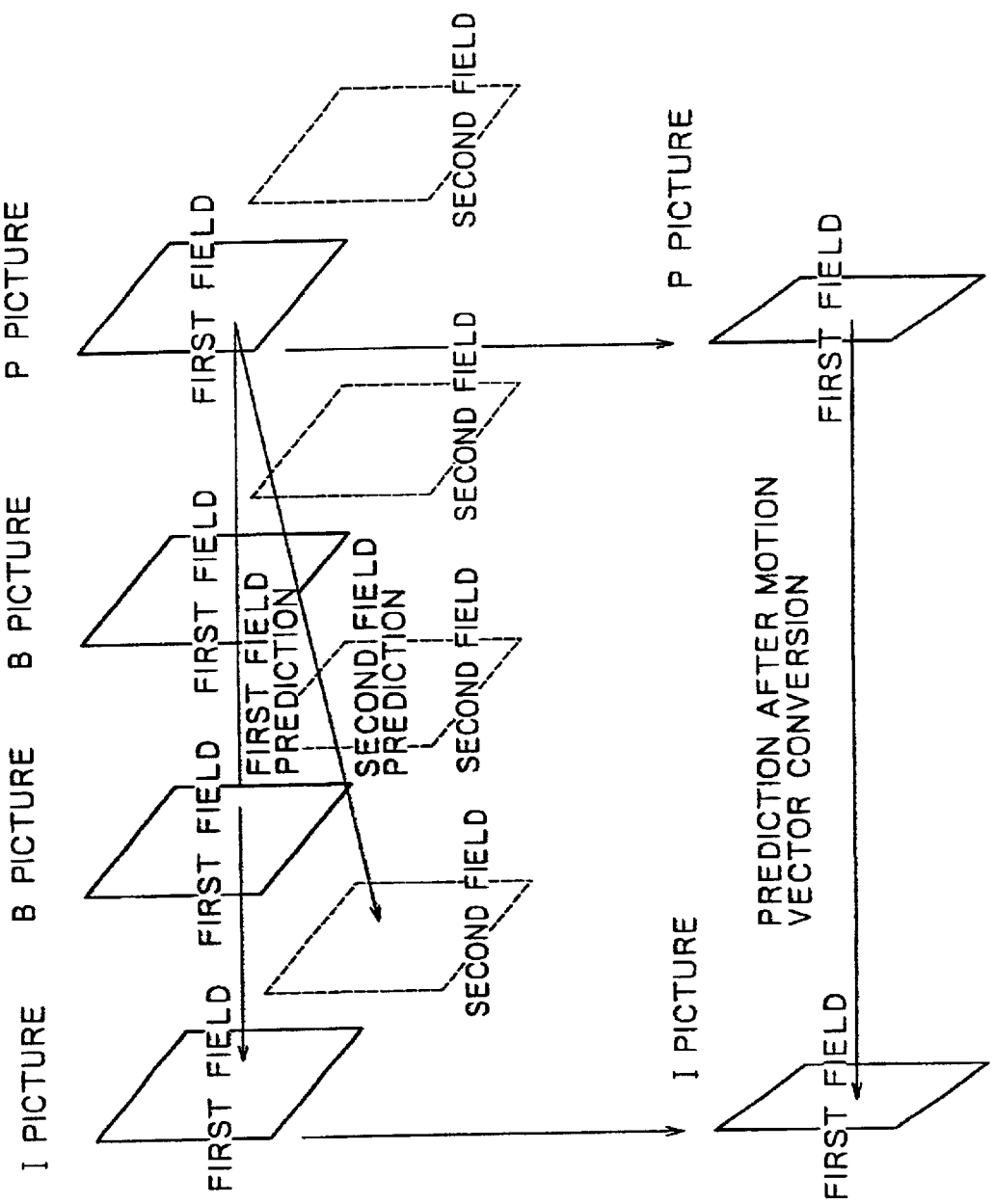
FIG. 4 is a diagrammatic view illustrating a principle of operation of a resolution frame rate conversion apparatus in the image information conversion apparatus of FIG. 2.
Figure 5:
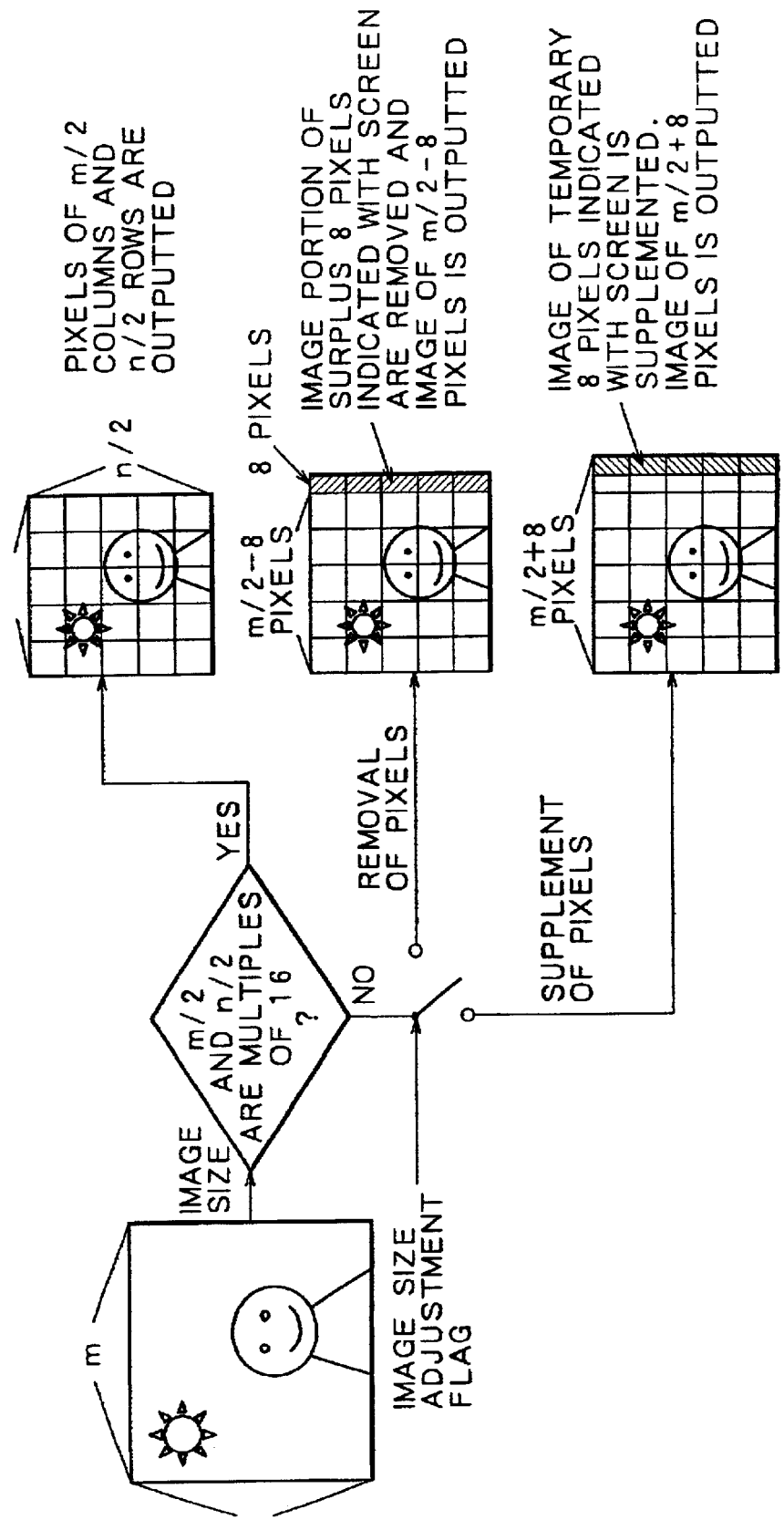
FIG. 5 is a schematic view illustrating a principle of operation of supplementing or removing a pixel of the resolution frame rate conversion apparatus in the image information conversion apparatus of FIG. 2 in accordance with an image frame size adjustment flag.
Figure 7:
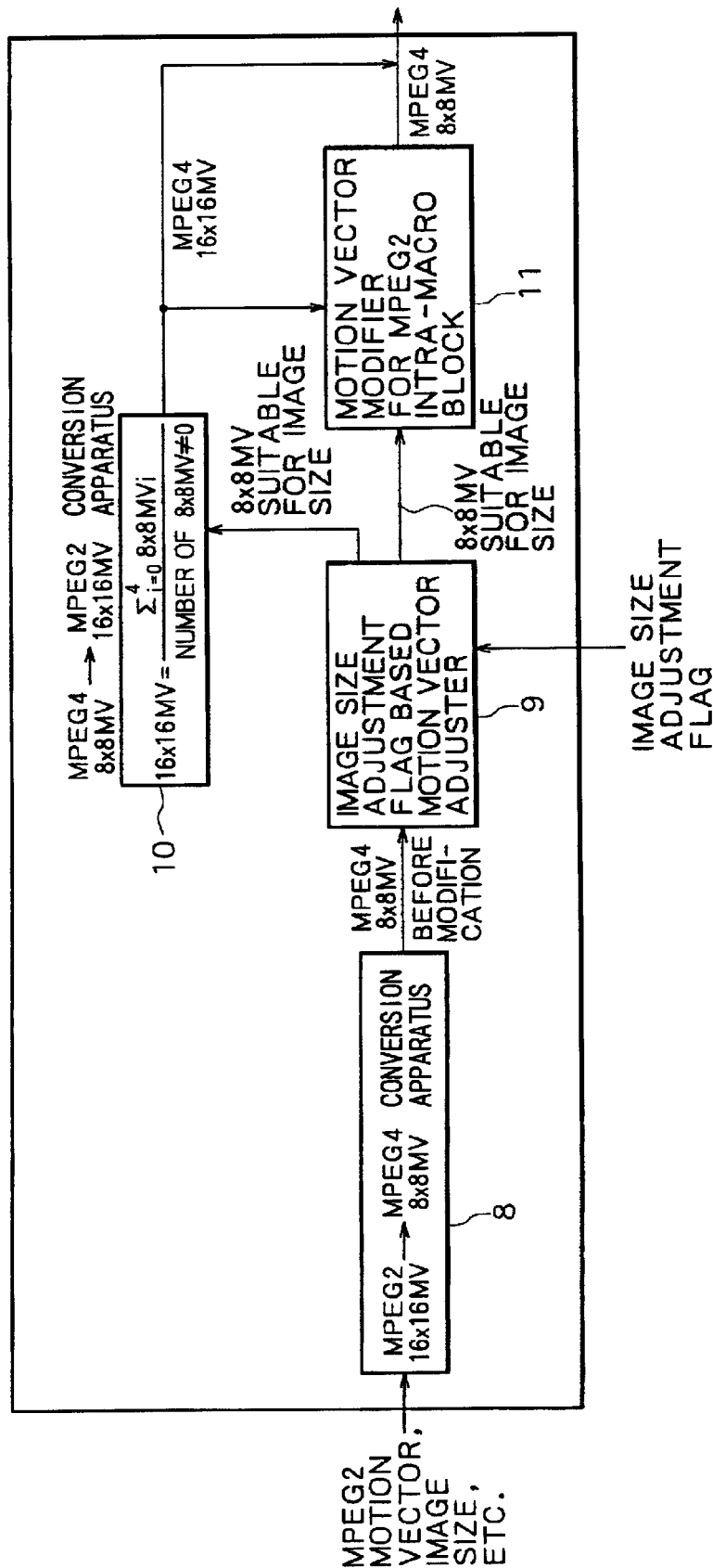
FIG. 7 is a block diagram showing a detailed configuration of the motion vector conversion apparatus in the image information conversion apparatus of FIG. 2.
Figure 8:
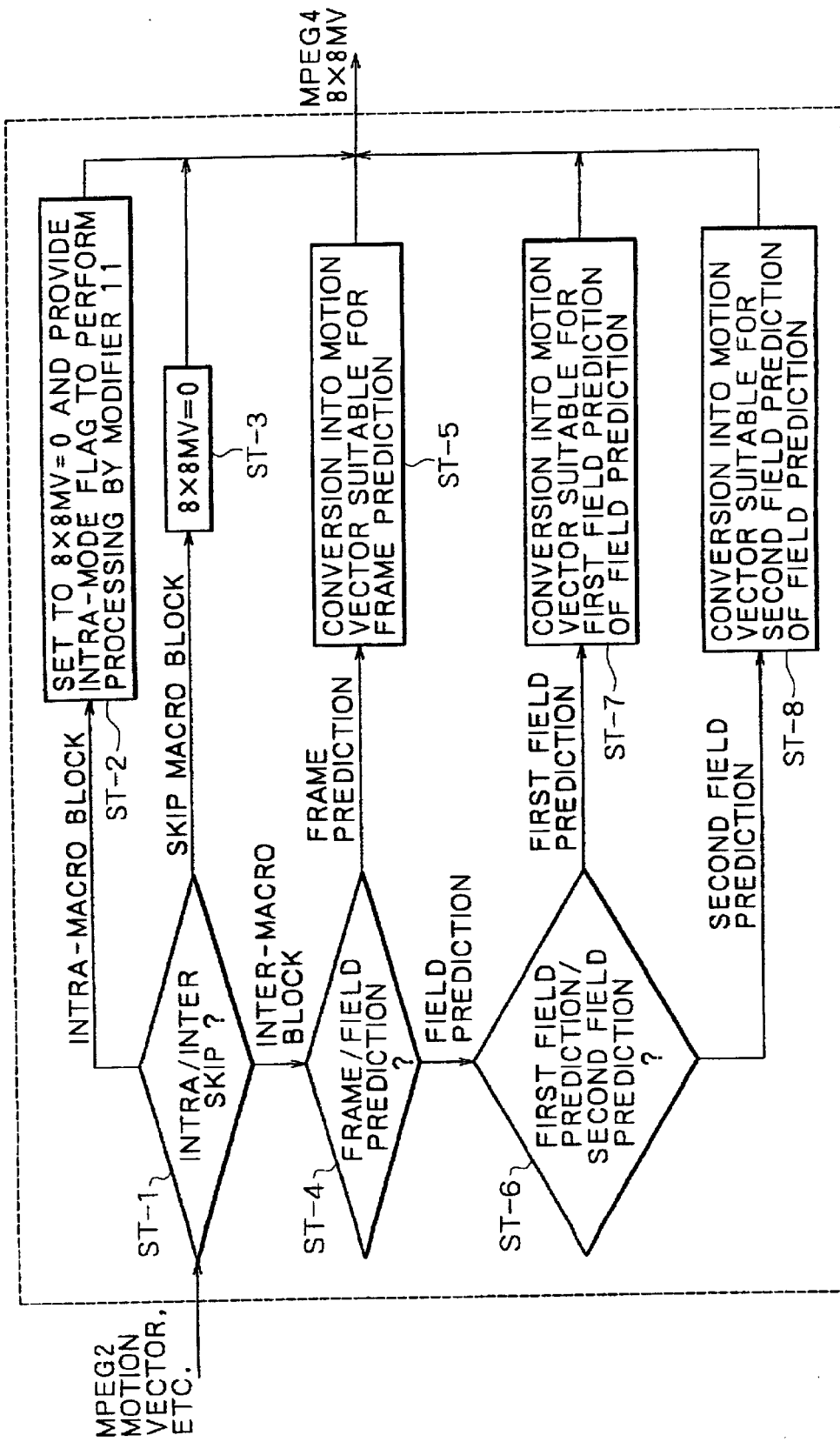
FIG. 8 is a flow chart illustrating a principle of operation of an MPEG2 16×16 motion vector to MPEG4 8×8 motion vector conversion apparatus in the image information conversion apparatus of FIG. 2.
Figure 13:
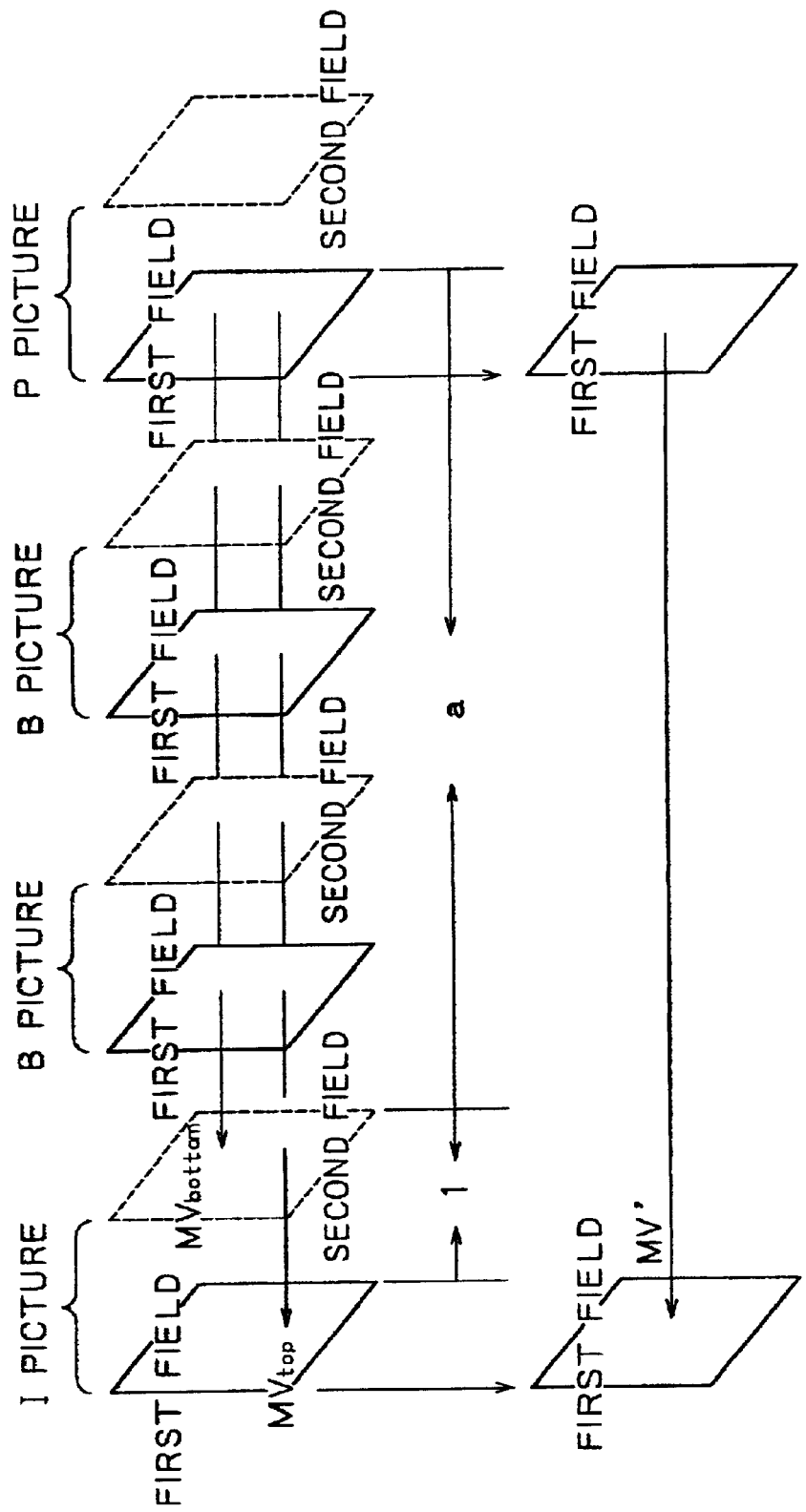
FIG. 13 is a diagrammatic view illustrating motion vector conversion wherein the image illustrated in FIG. 9 has a frame structure and second field prediction is used.
Figure 14:
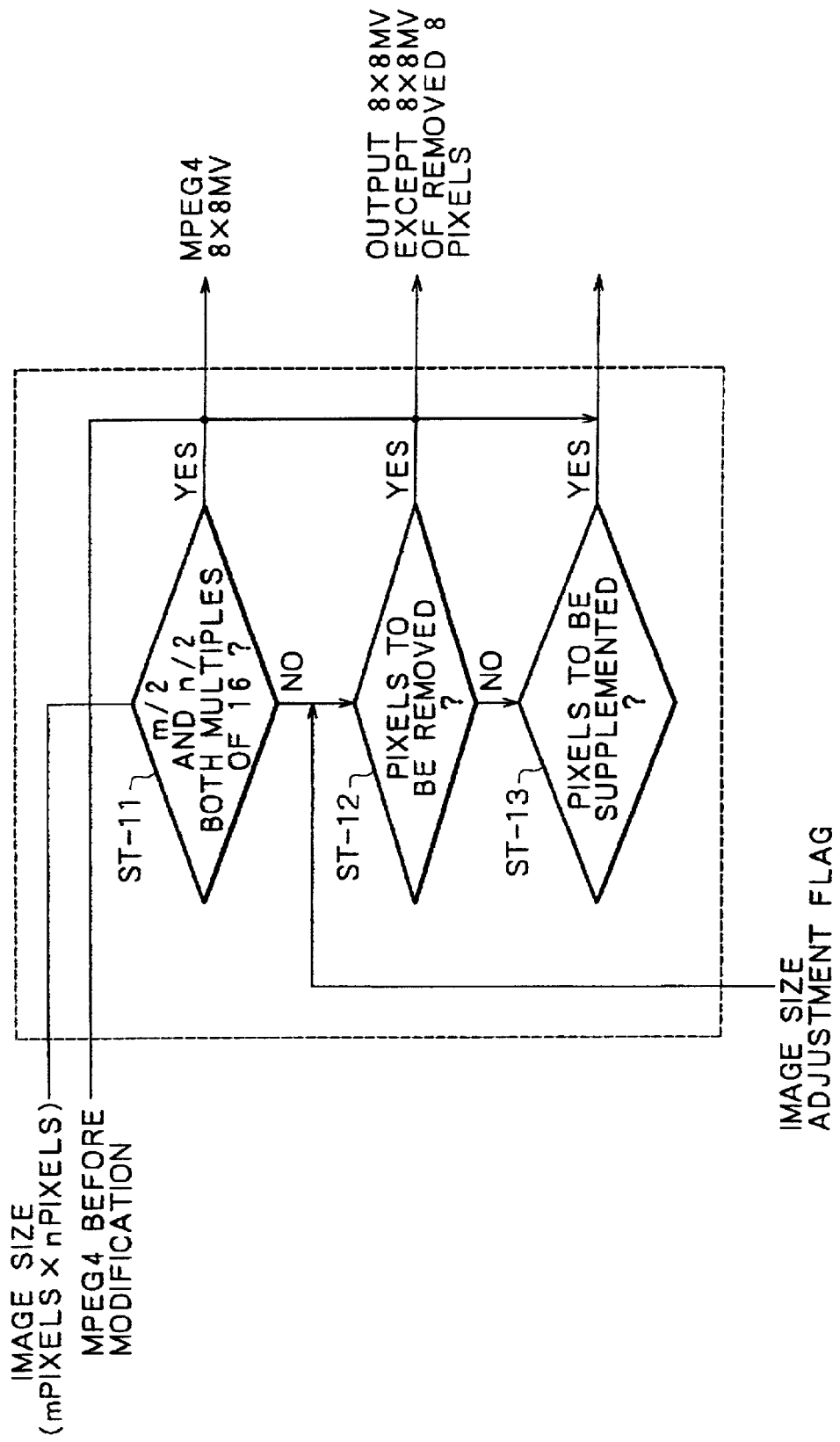
FIG. 14 is a flow chart illustrating operation of a motion vector modifier which operates with an image size adjustment flag in the motion vector conversion apparatus of FIG. 7.
Figure 15:
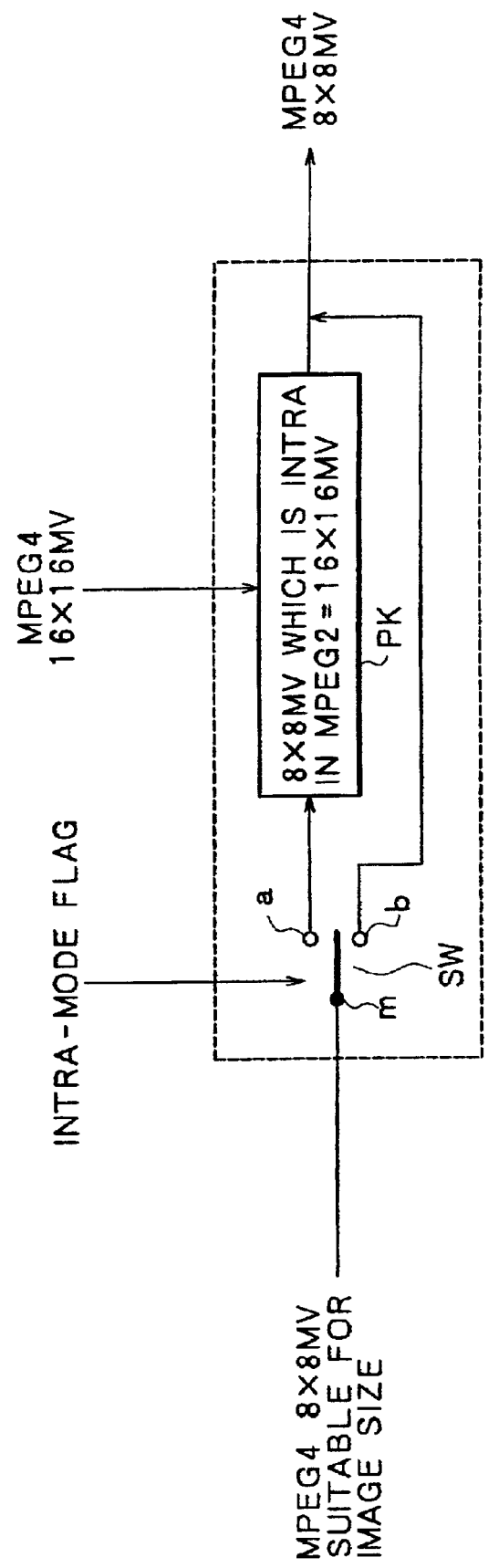
FIG. 15 is a block diagram illustrating a principle of operation of the motion vector modifier shown in FIG. 7 which performs motion vector modification for an intra-macro block of MPEG2.
Figure 16:
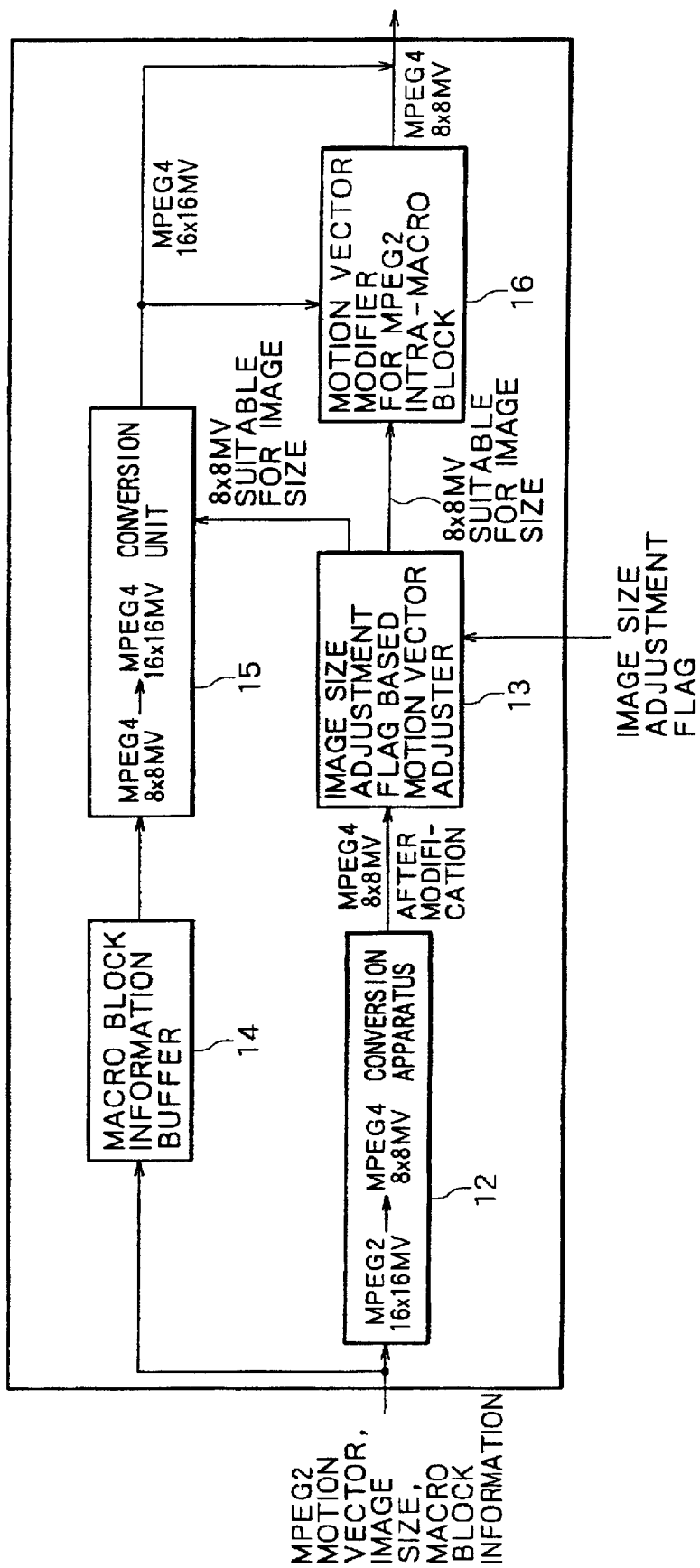
FIG. 16 is a block diagram showing a detailed configuration of the motion vector conversion apparatus in the image information conversion apparatus of FIG. 2.
Figure 19B:
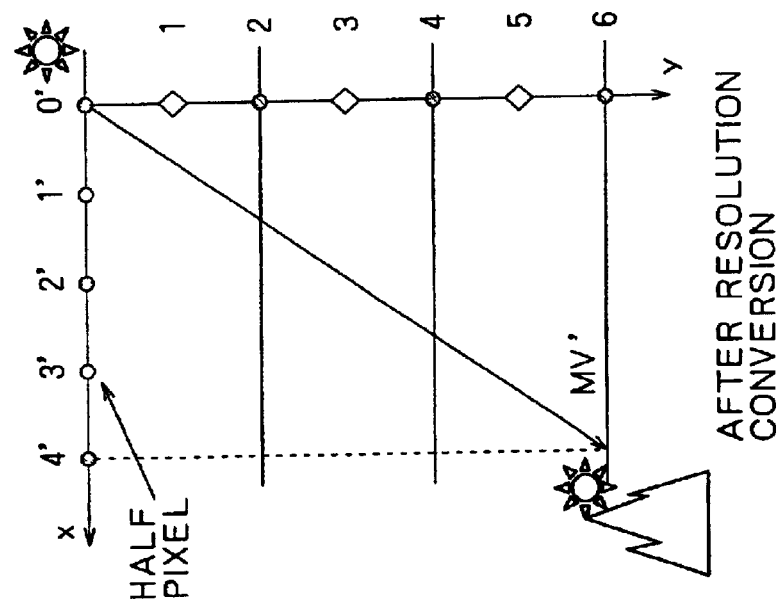
FIGS. 19A and 19B are diagrammatic views illustrating a concept of motion vector conversion wherein the image when a motion-vector re-search is performed by the motion vector conversion apparatus of FIG. 7 has a frame structure and first field prediction is used.
Figure 19A:
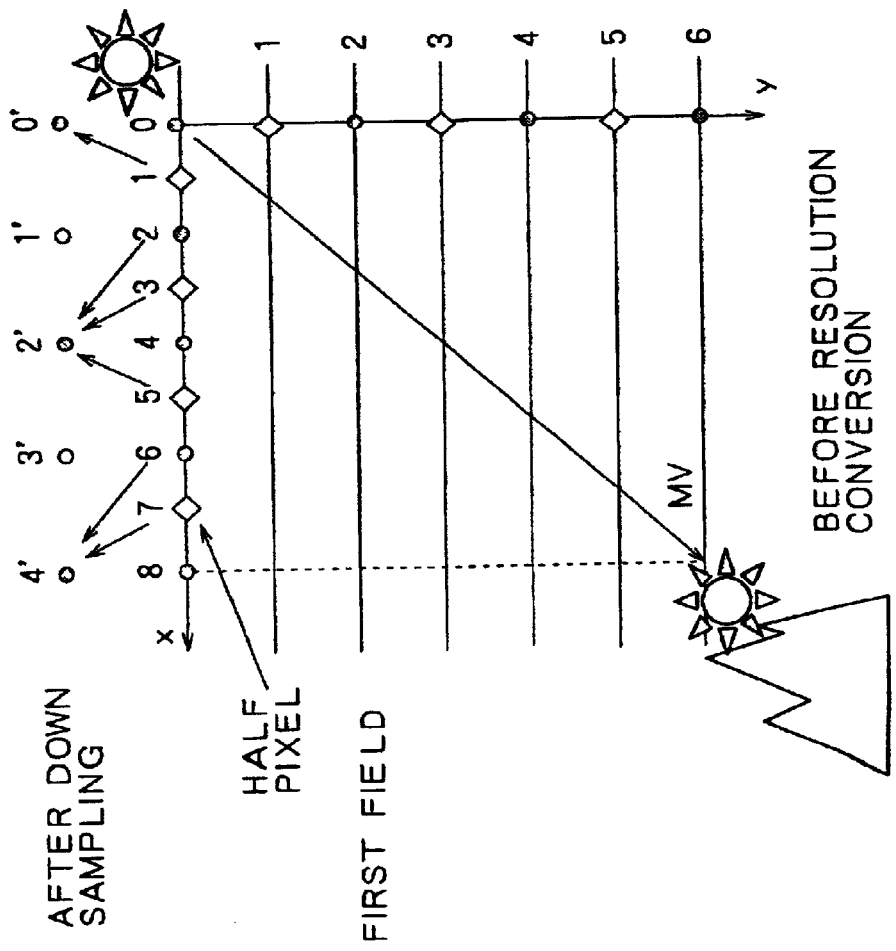
Figure 22:
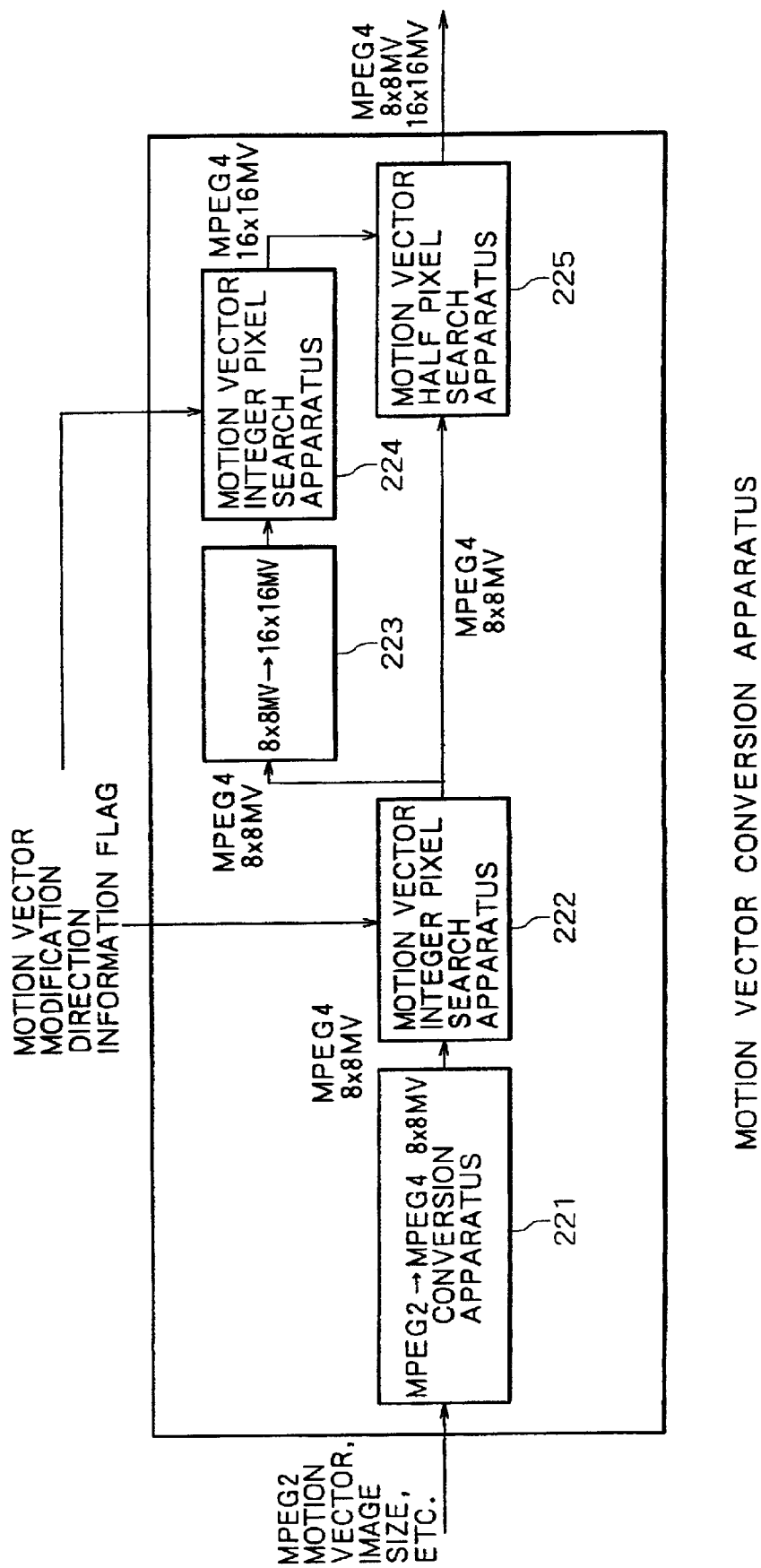
FIG. 22 is a block diagram showing a motion vector re-search apparatus which performs a re-search process for an 8×8 motion vector and produces a 16×16 motion vector based on a predictive residual.
Figure 23A:
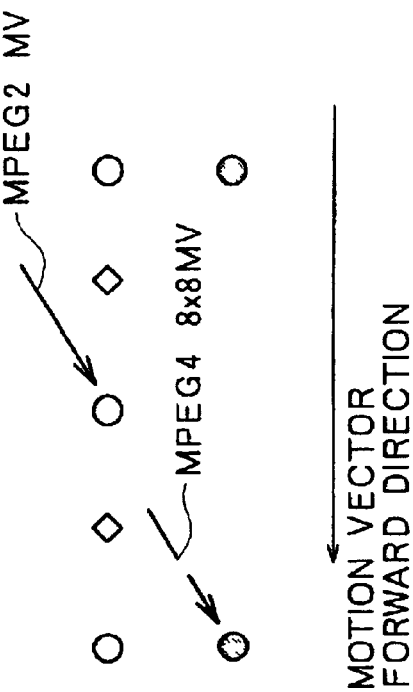
FIGS. 23A and 23B are diagrammatic views illustrating a distortion of a motion vector by spatial modification.
Figure 23B:
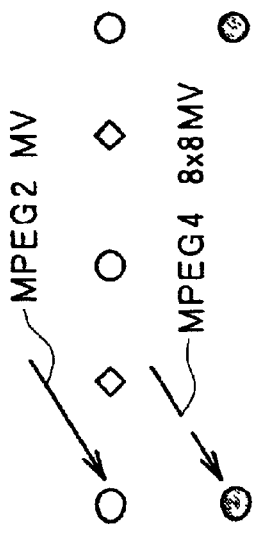
Figure 25:
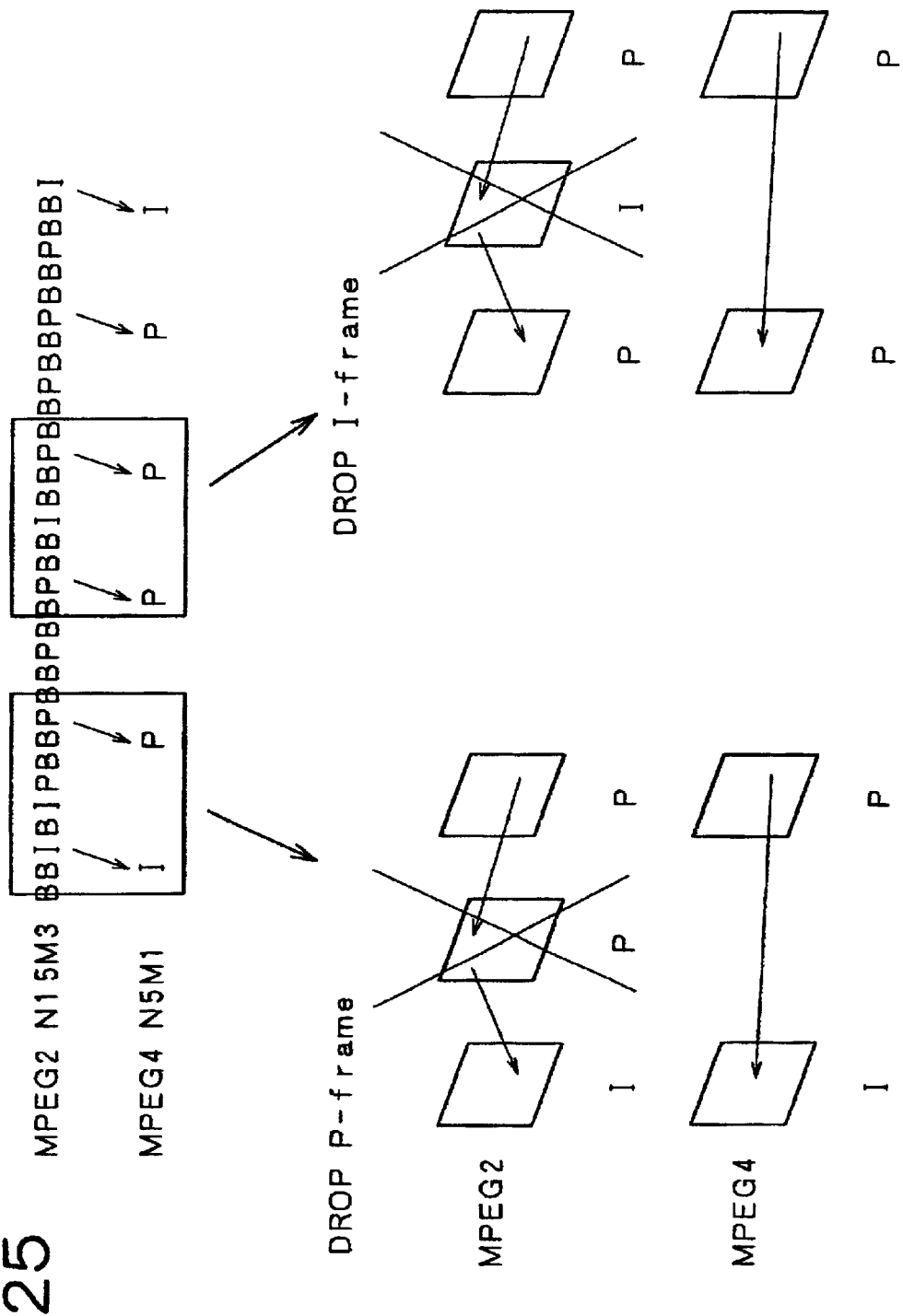
FIG. 25 is a diagrammatic view illustrating dropping of an I frame according to an embodiment of the present invention.

FIG. 25 illustrates a concept of a correspondence relationship between a picture type and a VOP (Video Object Plane) type upon conversion from an MPEG2 stream into an MPEG4 stream. When a stream of MPEG2 of 30 frames per second wherein the GOP (Group Of Pictures) structure is N15M3 is to be converted into another stream of MPEG4 of 5 frames per second wherein the GOP structure is N5M1, every other ones of I and P frames are converted into MPEG4 frames. Since one GOP of N5M1 of the stream of MPEG4 corresponds to two GOPs of N15M1 of the stream of MPEG2 as seen in FIG. 25, upon conversion from MPEG2 into MPEG4, two cases are available including a case wherein a P frame is dropped and another case wherein an I frame is dropped.

Figure 26:
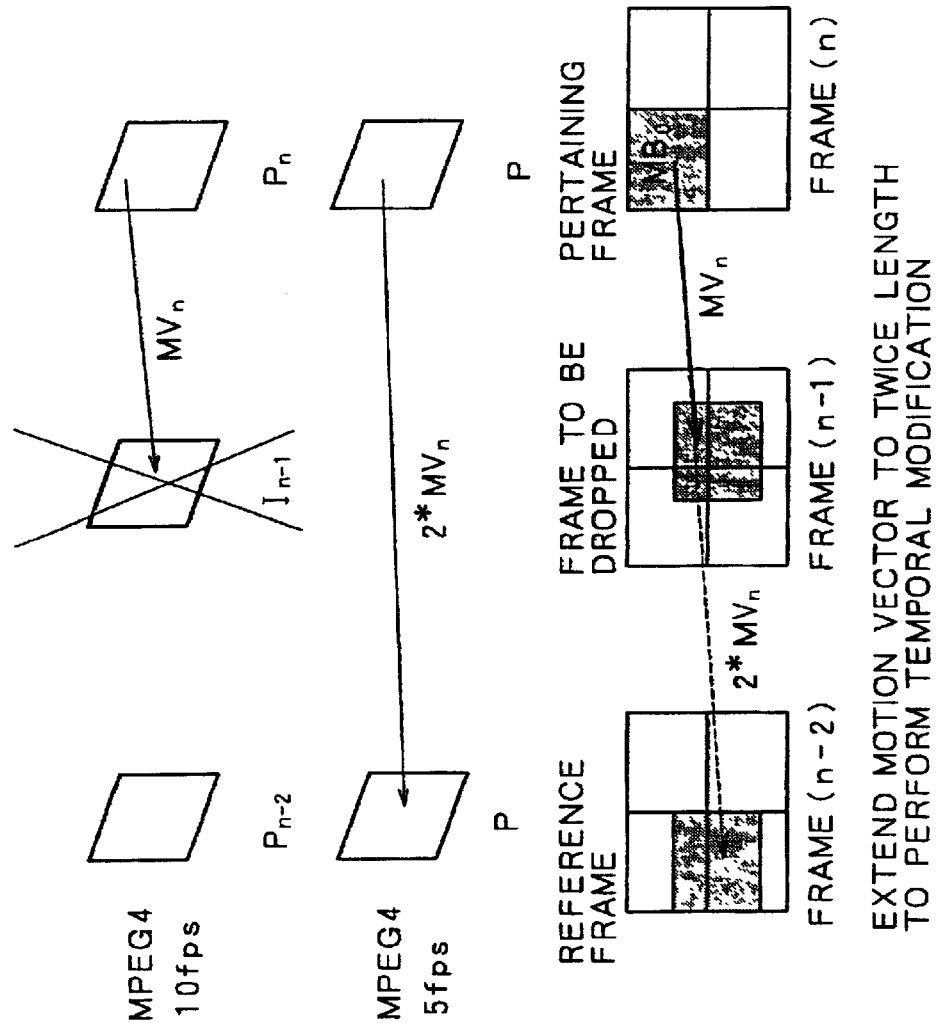
FIGS. 26, 27 and 28 are diagrammatic views illustrating dropping of a P frame according to the embodiment of the present invention.

First, dropping of an I frame is described with reference to FIG. 26. Since an I frame $I_{n-1}$ between P frames $P_{n-2}$ and $P_n$ does not include any motion vector, the motion vector of the dropped I frame cannot be added to the motion vector $MV_n$ of the pertaining macro block to synthesize a motion vector. Therefore, in the pertaining macro block, the motion vector $MV_n$ of the macro block is spatially and temporally modified by scaling in accordance with the method described hereinabove in the description of the related art, and then the length of the motion vector $MV_n$ in the temporal direction is extended to twice so as to refer to a VOP of MPEG4 converted from an I or P frame preceding to the dropped P frame to obtain a motion vector $2*MV_n$. Consequently, the VOP converted from the I or P frame immediately preceding to the frame whose motion vector of the P-VOP is referred to. In this manner, scaling by spatial and temporal modification is performed, and then, a motion vector extended to twice in the temporal direction is produced and outputted as an 8×8 motion vector.

Figure 27:
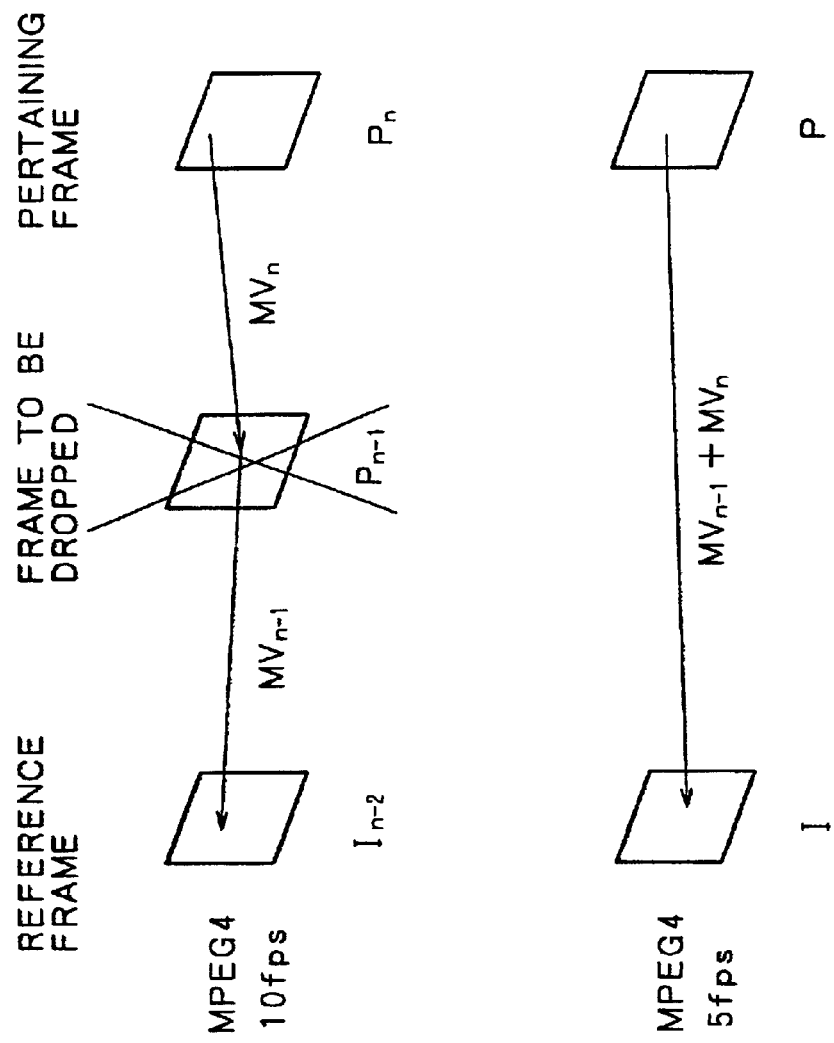

Now, dropping of a P frame is described with reference to FIGS. 27, 28, 29 and 30. Referring first to FIG. 27, there is illustrated a concept of a process when a P frame is dropped. Since a P frame $P_{n-1}$ to be dropped between an I frame $I_{n-2}$ and a P frame $P_n$ has a motion vector $MV_{n-1}$, the motion vector $MV_{n-1}$ of the P frame to be dropped is added to the motion vector $MV_n$ of the pertaining macro block to produce a motion vector $MV_{n-1}+MV_{n1}$ which refers to the frame preceding to the P frame to be dropped.

Figure 28:
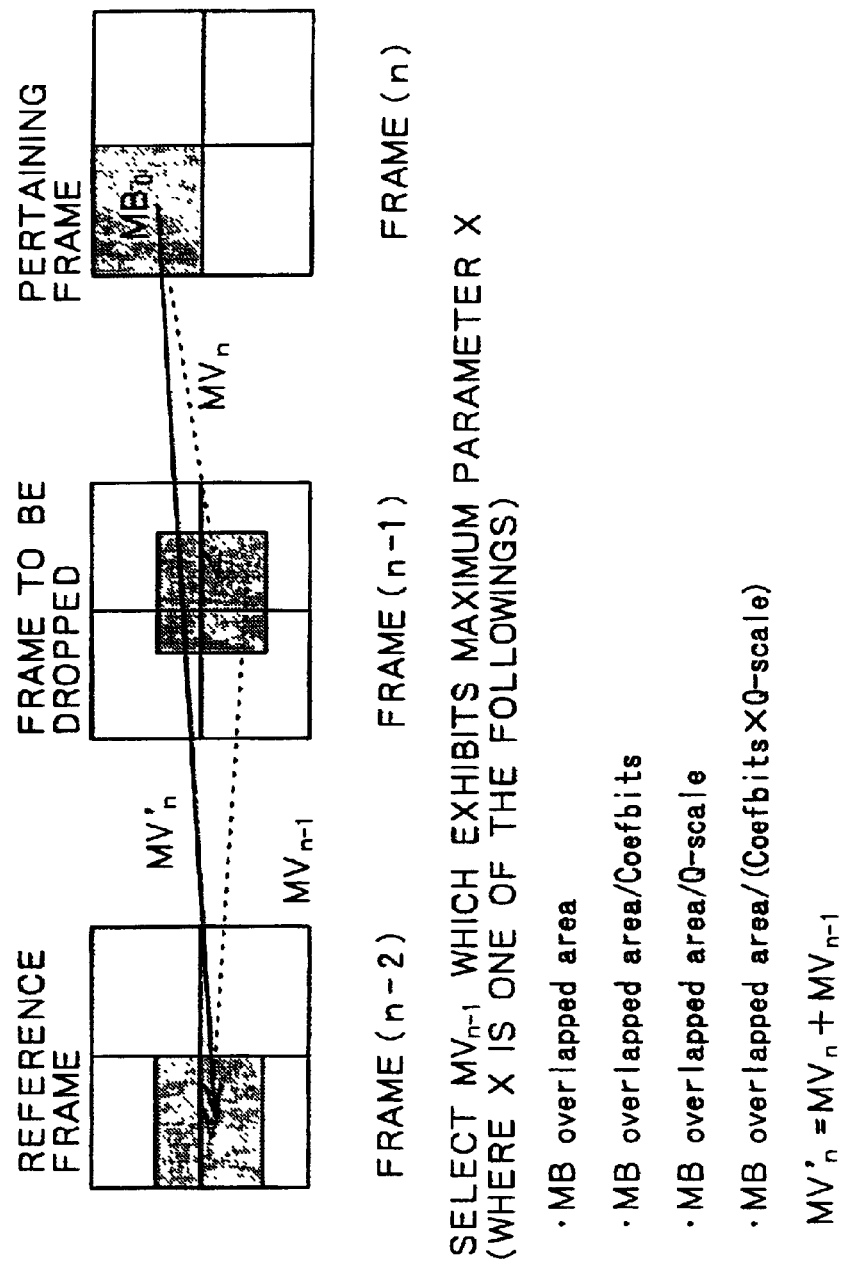

As shown in FIG. 28, a motion vector of the macro block in the P frame next to the P frame to be dropped refers to the P frame to be dropped. In this case, the reference area overlaps with a plurality of macro blocks to be referred to in the P frame to be dropped.

Figure 29:
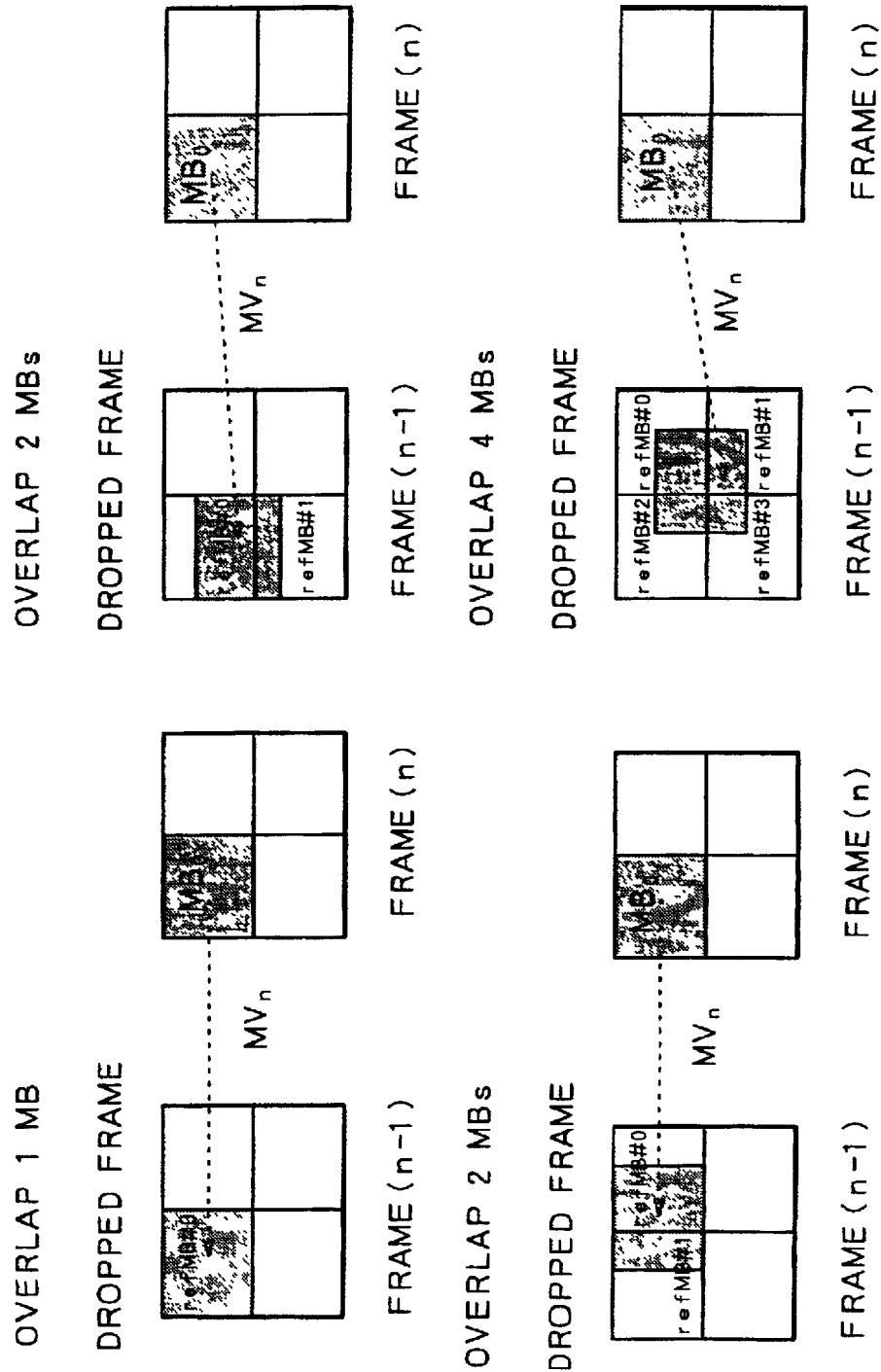
FIG. 29 is a diagrammatic view illustrating in what manner a reference macro block overlaps with a plurality of macro blocks according to the embodiment of the present invention.

FIG. 29 illustrates in what manner the area $MB_0$ for reference overlaps with a plurality of macro blocks. As can be seen from FIG. 29, the area $MB_0$ for reference may possibly overlap with one, two or four macro blocks (MB). The portions at which the area $MB_0$ for reference overlaps with the macro blocks MB are denoted by refMB#0, refMB#1, refMB#2 and refMB#3. Motion vectors, macro block modes and prediction modes, bit numbers or quantization scales of the P frame to be dropped are stored in a unit of a frame into a motion vector and macro block information buffer in order to allow later synthesis of motion vectors by addition. With regard to the pertaining macro block for which motion vector conversion from MPEG2 to MPEG4 is to be performed, coordinates to be referred to by the motion vector on the dropped P frame are calculated. As seen from FIG. 29, depending upon the coordinates referred to by the motion vector, the area $MB_0$ for reference may possibly overlap with one, two or four macro blocks (MB) of the reference P frame dropped. Where the area $MB_0$ for reference overlaps with a plurality of macro blocks, the coding efficiencies of the macro blocks are re-arranged in a descending order based on a parameter X determined in advance.

In particular, in a first method, the parameter X is the "number of pixels in each of portions, overlapping with the macro block in the P frame next to the P frame to be dropped, of macro blocks in the P frame to be dropped"; in a second method, the parameter X is the "number of pixels in each of portions, overlapping with the macro block in the P frame next to the P frame to be dropped, of macro blocks in the P frame to be dropped/macro block bit number"; in a third method, the parameter X is the "number of pixels in each of portions, overlapping with the macro block in the P frame next to the P frame to be dropped, of macro blocks in the P frame to be dropped/Q-scale" (the Q scale signifies a macro block quantization scale); in a fourth method, the parameter X is the "number of pixels in each of portions, overlapping with the macro block in the P frame next to the P frame to be dropped, of macro blocks in the P frame to be dropped/ (macro block bit number×Q-scale"; in a fifth method, the parameter X is 1/macro block bit number; in a sixth method, the parameter X is the (1/Q-scale); and in a seventh method, the parameter X is 1/(macro block bit number×Q-scale). The highest one of the values of the parameter X is determined as a maximum value, and the lowest one of the values of the parameter X is determined as a minimum value. In FIG. 28, the parameters X according to the first to fourth methods described above are illustrated. In FIG. 28, "$MB_{overlapped\ area}$" denotes the number of pixels in each of portions, overlapping with the macro block in the P frame next to the P frame to be dropped, of macro blocks in the P frame to be dropped"; "Coef bits" denotes the macro bit number; and "Q-scale" denotes the macro block quantization scale.

Figure 30:
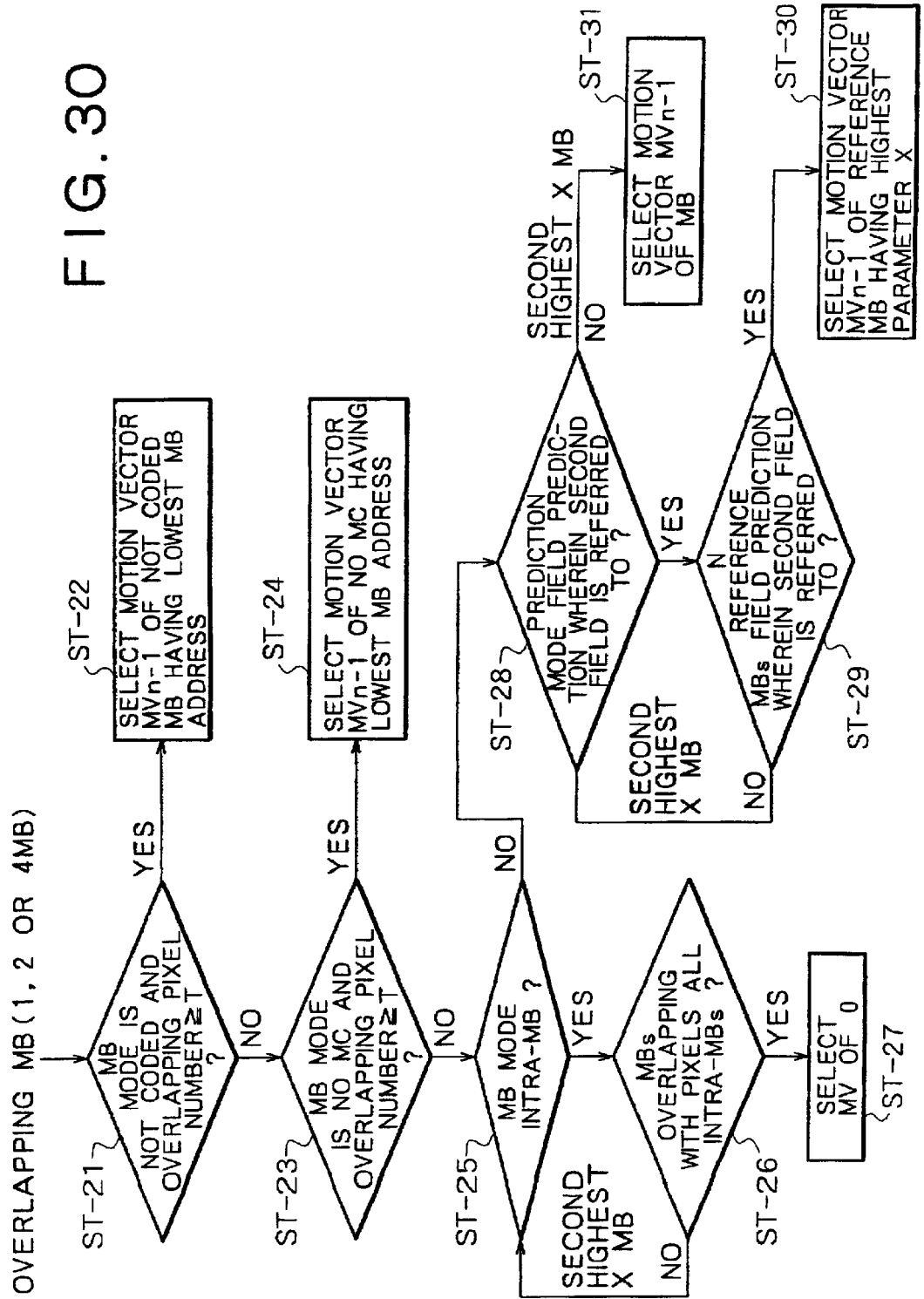
FIG. 30 is a flow chart illustrating a motion vector synthesis algorithm where a P frame is dropped according to the embodiment of the present invention.

Now, a motion vector synthesis algorithm where a P frame is dropped is described with reference to a flow chart of FIG. 30. First, from among one, two or four macro blocks (MB) in the P frame to be dropped, which overlap with an MPEG2 motion vector of the pertaining area in order to be referred to, those in which the macro block (MB) mode is Not Coded (whose DCT coefficients are not coded) and a number of pixels in the overlapping macro block is greater than a threshold value T are searched for (step ST-21). The threshold value T is set, for example, to 100 pixels. If at least one macro block (MB) of Not Coded is included in the overlapping macro blocks, then the motion vector $MV_{n-1}$ of the macro block (MB) of Not Coded having the lowest macro block (MB) address is selected (step ST-22).

If a macro block of Not Coded (whose DCT coefficients are not coded) is not included in the one, two or four macro blocks in the P frame to be dropped, which overlap with the MPEG2 motion vector of the pertaining area in order to be referred to, then macro blocks in which the macro block (MB) mode is No MC (no motion compensation) and a number of pixels in the overlapping macro block is greater than the threshold value T are searched for (step ST-23). The threshold value T is set, for example, to 100 pixels. If at least one macro block of No MC is included in the overlapping macro blocks, then the motion vector $MV_{n-1}$ of the macro blocks of No MC having the lowest macro block address is selected (step ST-24).

If a macro block of Not Coded (whose DCT coefficients are not coded) or No MC (No motion compensation) is not included in the one, two or four macro blocks which overlap with the MPEG2 motion vector of the pertaining macro block in order to be referred to, then it is discriminated in order beginning with the macro block which has the maximum parameter X described above whether or not the macro block (MB) mode of each of the macro blocks is an intra-macro block (MB (step ST-25) If the reference macro block is an intra-macro block, then it is discriminated whether or not the macro block which has the second maximum parameter X is an intra-macro block and it is discriminated whether or not all of the macro blocks which overlap with the pertaining macro block are intra-macro blocks in order to be referred to (step ST-26). If all of the macro blocks which overlap with the pertaining macro block in order to be referred to are intra-macro blocks, then a zero motion vector (MV) is selected (step ST-27).

If a macro block which is not an intra-macro block is searched out in step ST-25, then the processing advances to a next discrimination routine. In particular, it is discriminated whether or not the prediction mode of the macro block which is not an intra-macro block is field prediction wherein the second field is referred to (step ST-28). If the field prediction wherein the second field is referred to is used, then similar discrimination is performed for the reference block which has the second maximum parameter X (step ST-29). If N (the number of intra-macro blocks) reference macro blocks use the field prediction wherein the second field is referred to, then the motion vector $MV_{n-1}$ of the reference macro block (MB) which has the highest parameter X (step ST-30) is selected. N is a number determined in advance and has the value of 1, 2, 3 or 4. If a macro block which does not use the field prediction wherein the second field is referred to is searched out, then the motion vector $MV_{n-1}$ of the macro block is selected (step ST-31). A motion vector to be added to the motion vector of the pertaining macro block is selected in this manner.

Figure 31:
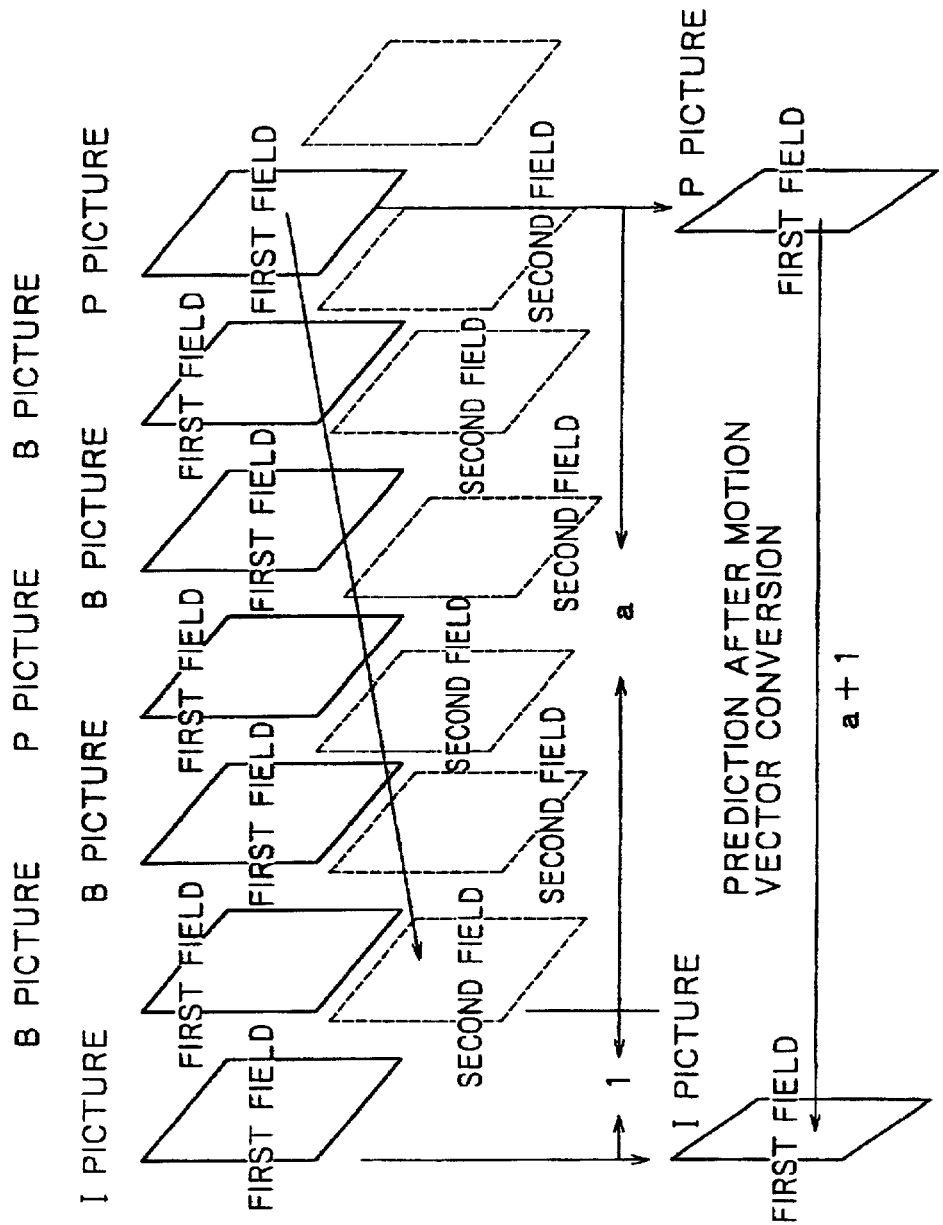
FIG. 31 is a diagrammatic view illustrating temporal modification of a motion vector wherein the second field of a motion vector is referred to according to the embodiment of the present invention.

FIG. 31 illustrates temporal modification of a motion vector which refers to the second field. Scaling (resolution conversion) of the motion vector obtained by the addition is performed in accordance with a method similar to the scaling method wherein spatial and temporal modification is performed for a motion vector described hereinabove in the description of the related art. Consequently, if the motion vector obtained by the addition refers to the second field of the reference frame, then field modification is performed for the vertical component of the motion vector, and then the motion vector is extended by an amount equal to one field distance in the temporal direction as vector modification. As seen in FIG. 31, the field distance between the pertaining field and the second field to be referred to is denoted by a, and therefore, the motion vector is multiplied by (a+1)/a in order to temporally modify the same for one field. An 8×8 motion vector is determined in this manner and outputted.

Figure 32:
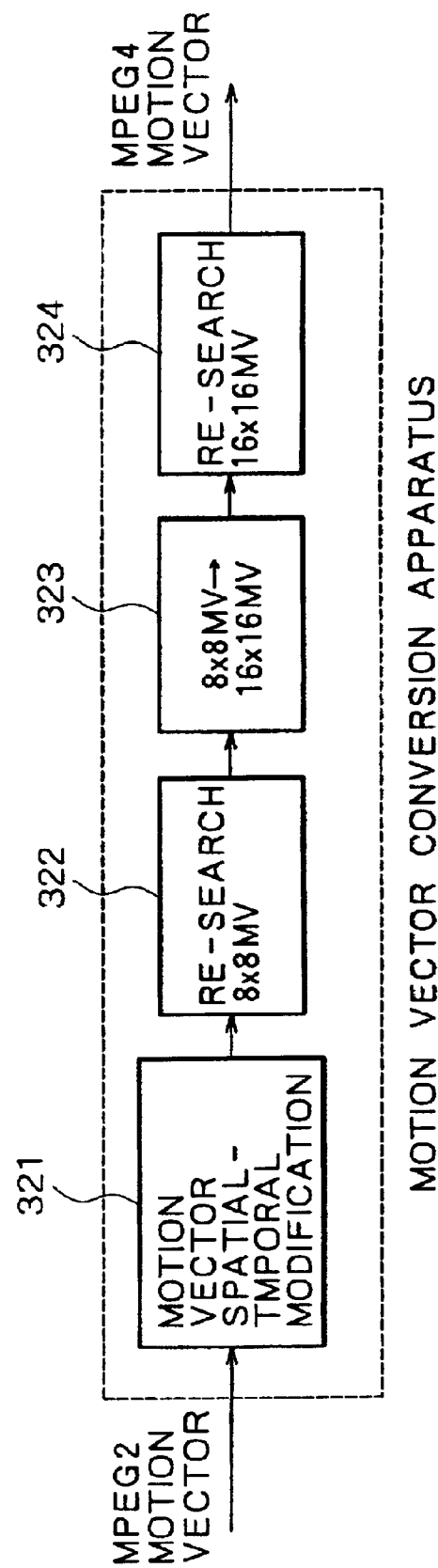
FIG. 32 is a block diagram showing an example of a motion vector conversion apparatus according to the embodiment of the present invention.

FIG. 32 shows a configuration of a motion vector conversion apparatus which drops an I frame. Referring to FIG. 32, the motion vector conversion apparatus is similar to the motion vector conversion apparatus 6 described hereinabove with reference to FIG. 2. First, motion vectors of MPEG2 are inputted to a motion vector spatial-temporal modification apparatus 321, by which spatial and temporal modification of the motion vectors is performed in a similar manner as described hereinabove to produce 8×8 motion vectors. Then, the 8×8 motion vectors are inputted to an 8×8 MV re-search apparatus 322, in which a re-search process for 8×8 motion vectors is performed as described hereinabove in the description of the related art. For example, a search window centered at a reference destination of each of the produced 8×8 motion vectors is produced with two integer pixels in the horizontal and vertical directions, and a search is performed within the search window. Consequently, the prediction accuracy of the 8×8 motion vector can be improved. Then, prediction errors researched with regard to four 8×8 motion vectors which form one macro block and the 8×8 motion vectors for which the re-search process has been performed are inputted to an 8×8 MV to 16×16 MV conversion apparatus 323.

The 8×8 MV to 16×16 MV conversion apparatus 323 discriminates that one of the four 8×8 motion vectors which has the lowest prediction error and allocates the discriminated motion vector to the 16×16 motion vector. Then, the produced 16×16 motion vector is inputted to a 16×16 MV re-search apparatus 324, by which a re-search process is performed similarly as described in the description of the related art to improve the prediction accuracy of the 16×16 motion vector. The 8×8 motion vectors and the 16×16 motion vector of MPEG4 produced in this manner are outputted.

Figure 33:
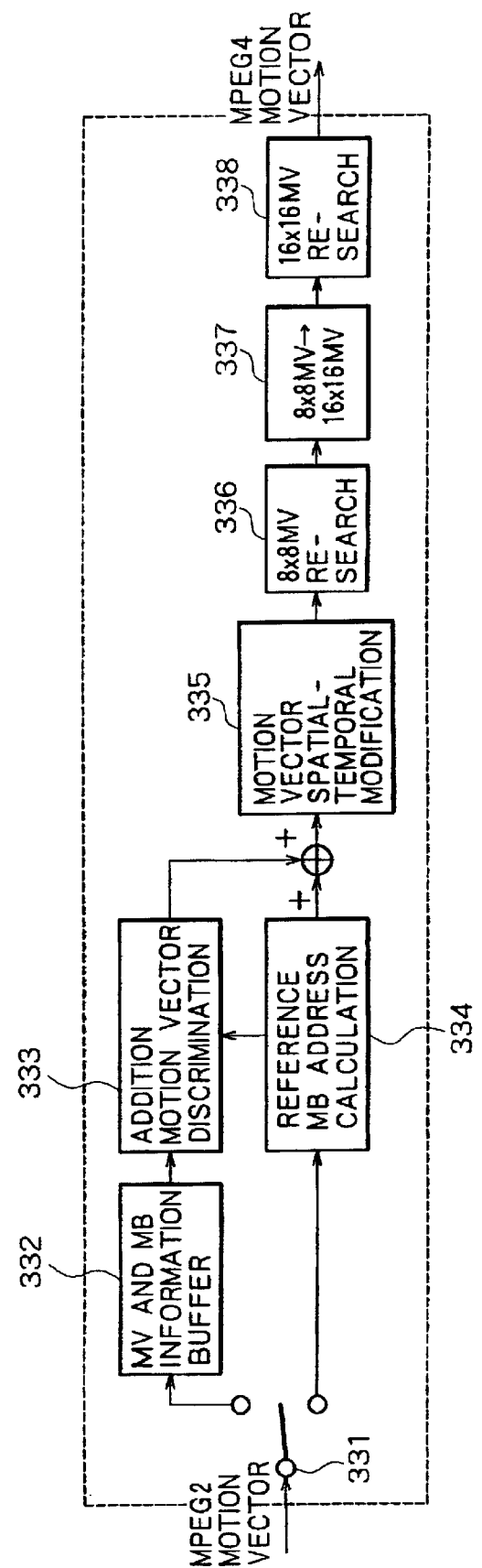
FIG. 33 is a block diagram showing another example of the motion vector conversion apparatus according to the embodiment of the present invention.

FIG. 33 shows a configuration of a motion vector conversion apparatus which drops a P frame. Referring to FIG. 33, the motion vector conversion apparatus is similar to the motion vector conversion apparatus 6 described hereinabove with reference to FIG. 2. First, motion vectors of MPEG2 are inputted to a changeover switch 331. The changeover switch 331 is switched to an MV and MB information buffer 332 side when the motion vector of MPEG2 inputted is information of a P frame to be dropped, but is switched to a reference MB address calculation apparatus 334 side when the motion vector of MPEG2 inputted is information of any other P frame.

The MV and MB information buffer 332 stores motion vector information and macro block prediction modes of P frames to be dropped in a unit of frames and, according to circumstances, stores the bit amount and the quantization scale of each of the macro blocks. The reference MB address calculation apparatus 334 accepts motion vectors of a P frame next to a P frame to be dropped and calculates a reference position of each of the motion vectors. The reference position of the motion vector is inputted to an addition mode vector discriminator 333, by which macro blocks of the P frame to be dropped which overlap with the reference macro block are calculated based on the reference position. The addition mode vector discriminator 333 makes use of this information to perform processing based on such a technique of selecting a motion vector to be added as described above, and outputs a motion vector to be added. The outputted motion vector is added to the motion vector of the pertaining macro block to produce a synthesized motion vector.

Motion vectors synthesized in this manner are inputted to a motion vector spatial-temporal modification apparatus 335, by which spatial and temporal modification scaling is performed for the motion vectors in a similar manner as described hereinabove in the description of the related art and in the paragraphs given hereinabove to produce 8×8 motion vectors. An 8×8 MV re-search apparatus 336, an 8×8 MV to 16×16 MV conversion apparatus 337 and a 16×16 motion vector re-search apparatus 338 operate similarly to the 8×8 MV re-search apparatus 322, 8×8 MV to 16×16 MV conversion apparatus 323 and 16×16 MV re-search apparatus 324 of the motion vector conversion apparatus of FIG. 32, respectively, to produce a 16×16 motion vector. The 8×8 motion vectors and the 16×16 motion vector of MPEG4 produced in this manner are outputted. In this manner, an 8×8 motion vector of MPEG4 can be determined for each of four blocks which form one macro block by a re-search. Prediction errors determined by the re-search of the four 8×8 motion vectors of MPEG4 are compared with one another to discriminate the 8×8 motion vector which has the smallest prediction error. The 8×8 motion vector having the smallest prediction error is allocated to the 16×16 motion vector.

Also for the selected 16×16 motion vector, a re-search is performed in a similar manner as in the 8×8 motion vector re-search method described hereinabove to optimize the coding efficiency of the 16×16 motion vector.

In this manner, in a procedure wherein image information compression information of MPEG2 is inputted to determine 8×8 motion vectors and 16×16 motion vectors of MPEG4, the motion vector conversion apparatus extends or adds the motion vectors and performs motion vector modification by a re-search of the scaled motion vector information centered at each of the motion vectors. Consequently, a drop of the coding efficiency of an image coding apparatus of MPEG4 can be minimized.

FIG. 34 shows another configuration of the motion vector conversion apparatus. It is to be noted that, before description with reference to FIG. 34, similar description to that given hereinabove with reference to FIGS. 25 and 26 must be given. For the description, however, the description given hereinabove with reference to FIGS. 25 and 26 are quoted. Referring to FIG. 34, the motion vector conversion apparatus shown is similar to the motion vector conversion apparatus 6 described hereinabove with reference to FIG. 2. First, an MPEG4 to MPEG2 8×8 MV conversion apparatus 271 performs spatial and temporal modification of motion vectors described above to produce 8×8 motion vectors. Then, a motion vector integer pixel search apparatus 272 performs a re-search process for each of the 8×8 motion vectors as described hereinabove in the description of the related art. For example, a search window centered at a reference destination of each of the produced 8×8 motion vectors is produced with two integer pixels in the horizontal and vertical directions, and a search is performed within the search window. Consequently, the prediction accuracy of the 8×8 motion vector can be improved. Then, prediction errors re-searched with regard to four 8×8 motion vectors which form one macro block and the 8×8 motion vectors for which the re-search process has been performed are inputted to an 8×8 motion vector to 16×16 motion vector conversion apparatus 273.

The 8×8 motion vector to 16×16 motion vector conversion apparatus 273 discriminates that one of the four 8×8 motion vectors which has the lowest prediction error among the prediction errors determined upon the 8×8 motion vector re-search and allocates the discriminated motion vector to the 16×16 motion vector. Then, the produced 16×16 motion vector is inputted to a motion vector integer pixel search apparatus 274, by which a re-search process is performed similarly as described hereinabove in the description of the related art to improve the prediction accuracy of the 16×16 motion vector. The 8×8 motion vectors and the 16×16 motion vector of MPEG4 produced in this manner are outputted.

The 8×8 motion vectors and the 16×16 motion vector of MPEG4 outputted are inputted to a half pixel search apparatus 275, from which the 8×8 and 16×16 motion vectors are outputted with a half pixel accuracy.

In this manner, in a procedure wherein image information compression information of MPEG2 is inputted to determine 8×8 motion vectors and 16×16 motion vectors of MPEG4, the motion vector conversion apparatus extends or adds the motion vectors and performs motion vector modification by a re-search of the scaled motion vector information centered at each of the motion vectors. Consequently, a drop of the coding efficiency of an image coding apparatus of MPEG4 can be minimized.

FIG. 35 shows a further configuration of the motion vector conversion apparatus wherein a P frame is dropped. It is to be noted that, before description with reference to FIG. 35, similar description to that given hereinabove with reference to FIGS. 25 to 32 must be given. For the description, however, the description given hereinabove with reference to FIGS. 25 to 32 are quoted. Referring to FIG. 35, the motion vector conversion apparatus shown is similar to the motion vector conversion apparatus 6 described hereinabove with reference to FIG. 2. First, motion vectors of MPEG2 are inputted to a changeover switch 351. The changeover switch 351 is switched to an MV and MB information buffer 352 side when information of a P frame to be dropped is received, but is switched to a reference MB address calculation apparatus 354 and a motion vector extension spatial-temporal modification apparatus 357 side when information of any other P frame is received.

The MV and MB information buffer 352 stores motion vector information and macro block prediction modes of P frames to be dropped in a unit of a frame and, according to circumstances, stores the bit amount and the quantization scale of each of the macro blocks. The reference MB address calculation apparatus 354 accepts motion vectors of a P frame next to a P frame to be dropped and calculates a reference position of each of the motion vectors. The reference position of the motion vector is inputted to an addition motion vector discrimination apparatus 353, by which macro blocks of the P frame to be dropped which overlap with the reference macro block are calculated based on the reference position. The addition motion vector discrimination apparatus 353 makes use of this information to perform processing based on such a technique of selecting a motion vector to be added as described above, and outputs a motion vector to be added. The outputted motion vector is added to the motion vector of the pertaining macro block to produce a synthesized motion vector.

Motion vectors synthesized in this manner are inputted to a motion vector spatial-temporal modification apparatus 355, by which spatial and temporal modification scaling is performed for the motion vectors in a similar manner as described hereinabove in the description of the related art and in the paragraphs given hereinabove to produce 8×8 motion vectors. the motion vector extension spatial-temporal modification apparatus 357 and a motion vector re-search apparatus 358 are used to determine a motion vector in accordance with the extension method and perform processes similar to those of the motion vector spatial-temporal modification apparatus 321 and the 8×8 motion vector re-search apparatus 322, respectively. Consequently, motion vectors are produced by them. The motion vectors outputted from the motion vector re-search apparatus 356 and the motion vector re-search apparatus 358 are inputted to an 8×8 motion vector selection apparatus 359. The 8×8 motion vector selection apparatus 359 outputs those of the motion vectors from the motion vector re-search apparatus 356 and the motion vector re-search apparatus 358 which have smaller predictive residuals as 8×8 motion vectors. An 8×8 MV to 16×16 MV conversion apparatus 60 and a 16×16 motion vector re-search apparatus 361 operate similarly to the 8×8 MV to 16×16 MV conversion apparatus 323 and 16×16 MV re-search apparatus 324 of the motion vector conversion apparatus of FIG. 32, respectively, to produce a 16×16 motion vector. The 8×8 motion vectors and the 16×16 motion vector of MPEG4 produced in this manner are outputted.

In this manner, when a P frame is dropped, two different kinds of motion vectors including motion vectors determined by extension of motion vectors of four blocks which form one macro block and a motion vector determined by addition of the motion vectors. A re-search process is performed subsequently for the motion vectors and a motion vector which exhibits the smallest prediction error is outputted as an 8×8 motion vector of MPEG4. The method of the re-search may be similar to the method described hereinabove in the description of the related art, and, for example, the range of search of the search window is two integer pixels in the vertical and horizontal directions. Consequently, two motion vectors can be determined by a re-search for each of four blocks which form one macro block.

Then, prediction errors of the two motion vectors for one block are compared with each other, and one of the motion vectors which exhibits the lower predictive residual is outputted as an 8×8 motion vector. In this manner, between motion vectors determined by the method wherein a motion vector is extended and the method wherein motion vectors are added, the motion vector which has the highest coding efficiency can be selected to produce an 8×8 motion vector. Thereafter, prediction errors determined by a re-search of the four 8×8 motion vectors of MPEG4 of a macro bloc are compared with one another to discriminate the 8×8 motion vector which exhibits the smallest prediction error. The 8×8 motion vector which exhibits the smallest prediction error is allocated to a 16×16 motion vector. Then, a re-search is performed also for the selected 16×16 motion vector similarly as in the 8×8 motion vector re-search method described hereinabove to optimize the coding efficiency of the 16×16 motion vector.

In this manner, in a procedure wherein image information compression information of MPEG2 is inputted to determine 8×8 and 16×16 motion vectors of MPEG4, the motion vector conversion apparatus extends or adds the motion vectors and performs motion vector modification by a re-search of the scaled motion vector information centered at each of the motion vectors. Consequently, a drop of the coding efficiency of an image coding apparatus of MPEG4 can be minimized.

Although a bit stream representative of image compression information of MPEG2 is inputted and a bit stream representative of image compression information of MPEG4 is outputted as described above, the input and the output are not limited to the specific ones described, but they may otherwise be bit streams representative of image compression information, for example, of MPEG-1 or H.263.

While preferred embodiments of the present invention have been described using specific terms, such description is for illustrative purposes only, and it is to be understood that changes and variations may be made without departing from the spirit or scope of the following claims.

What is claimed is:

1. A motion vector conversion method for an image information conversion method wherein a bit stream representative of interlaced scanned image compression information of MPEG2 is inputted and a bit stream representative of progressively scanned image compression information of MPEG4 is outputted, comprising the steps of:

successively accepting 16×16 motion vectors of MPEG2 of the inputted bit stream representative of image compression information of MPEG2; and successively producing 8×8 motion vectors of MPEG4 and 16×16 motion vectors of MPEG4 based on the 16×16 motion vectors of MPEG2 such that every other one of I frames and P frames of the bit stream of MPEG2 is dropped to produce a bit stream of MPEG4 of a reduced frame rate and a low bit rate.

2. The motion vector conversion method according to claim 1, wherein said motion vector conversion method serves as motion vector modification; and motion vector information and macro block information in the inputted bit stream representative of image compression information of MPEG2 in each P frame to be dropped are stored into a buffer, and a motion vector to be added in said frame to be dropped is determined based on the information stored in said buffer, whereafter the determined motion vector is added, to produce an 8×8 motion vector.

3. The motion vector conversion method according to claim 2, wherein letting a parameter X be taken as a parameter associated with each motion vector in said P frame to be dropped, a motion vector having the highest parameter X in said P frame to be dropped is determined as said motion vector to be added in said P frame to be dropped.

4. The motion vector conversion method according to claim 3, wherein the parameter X is a parameter selected from the group consisting of the number of pixels in each of portions of one or more macro blocks in said P frame to be dropped, which portions overlap with a macro block of a motion vector of the P frame next to said P frame to be dropped in order to be referred to; a value obtained by dividing the number of pixels in each of portions of one or more macro blocks in said P frame to be dropped, which portions overlap with a macro block of a motion vector in the P frame next to said P frame to be dropped in order to be referred to, by a macro block bit number; a value obtained by dividing the number of pixels in each of portions of one or more macro blocks in said P frame to be dropped, which portions overlap with a macro block of a motion vector in the P frame next to said P frame to be dropped in order to be referred to, by a macro block quantization scale; and a value obtained by dividing the number of pixels in each of portions of one or more macro blocks in said P frame to be dropped, which portions overlap with a macro block of a motion vector in the P frame next to said P frame to be dropped in order to be referred to, by the product of a macro block quantization scale and the macro block bit number.

5. The motion vector conversion method according to claim 2, wherein letting a parameter X be taken as a parameter associated with each motion vector in said P frame to be dropped, a motion vector having the lowest parameter X in said P frame to be dropped is determined as said motion vector to be added in said P frame to be dropped.

6. The motion vector conversion method according to claim 5, wherein the parameter X is a parameter selected from the group consisting of a macro block bit number in each of portions of one or more macro blocks in said P frame to be dropped, which portions overlap with a macro block of a motion vector of the P frame next to said P frame to be dropped in order to be referred to; a macro block quantization scale in each of portions of one or more macro blocks in said P frame to be dropped, which portions overlap with a macro block of a motion vector in the P frame next to said P frame to be dropped in order to be referred to; and the product of a macro block quantization scale and the macro block bit number in each of portions of one or more macro blocks in said P frame to be dropped, which portions overlap with a macro block of a motion vector of the P frame next to said P frame to be dropped in order to be referred to.

7. The motion vector conversion method according to claim 2, wherein in the case where any of one or more macro blocks in said frame to be dropped, which overlap with a macro block of a motion vector in the P frame next to said P frame to be dropped in order to be referred to, is different from a macro block whose DCT coefficients are not coded and a macro block free from motion compensation, if all of the overlapping macro blocks in said frame to be dropped are intra-macro blocks, then a zero motion vector is selected.

8. The motion vector conversion method according to claim 2, wherein in the case where any of one or more macro blocks in said frame to be dropped, which overlap with a macro block of a motion vector in the P frame next to said P frame to be dropped in order to be referred to, is different from a macro block whose DCT coefficients are not coded and a macro block free from motion compensation and further the overlapping macro blocks in said frame to be dropped contains at least one macro block whose macro block mode is not an intra-macro block, if a prediction mode carried out for those of the overlapping macro blocks, whose macro-block mode is not an intra-macro block, is a second field prediction, then a motion vector of a macro block having the highest parameter X is selected.

9. The motion vector conversion method according to claim 8, wherein the parameter X is a parameter selected from the group consisting of the number of pixels in each of portions of one or more macro blocks in said P frame to be dropped, which portions overlap with a macro block of a motion vector in the P frame next to said P frame to be dropped in order to be referred; a value obtained by dividing the number of pixels in each of portions of one or more macro blocks in said P frame to be dropped, which portions overlap with a macro block of a motion vector in the P frame next to said P frame to be dropped in order to be referred to, by a macro block bit number; a value obtained by dividing the number of pixels in each of portions of one or more macro blocks in said P frame to be dropped, which portions overlap with a macro block of a motion vector in the P frame next to said P frame to be dropped in order to be referred to, by a macro block quantization scale; and a value obtained by dividing the number of pixels in each of portions of one or more macro blocks in said P frame to be dropped, which portions overlap with a macro block of a motion vector in the P frame next to said P frame to be dropped in order to be referred to, by the product of a macro block quantization scale and the macro block bit number.

10. The motion vector conversion method according to claim 1, wherein said motion vector conversion method serves as motion vector modification; and a motion vector in the P frame next to said I frame to be dropped is extended twice in the temporal direction based on motion vector information and macro block information in the inputted bit stream representative of image compression information of MPEG2, to produce an 8×8 motion vector.

11. The motion vector conversion method according to claim 1, wherein said motion vector conversion method serves as motion vector modification; and an 8×8 motion vector of MPEG4 is obtained from a motion vector of MPEG2 by a motion vector conversion method based on motion vector information in the inputted bit stream representative of image compression information of MPEG2 and is inputted; and a re-search for a motion vector centered at the inputted 8×8 motion vector value is performed to modify the motion vector such that one of four 8×8 motion vectors of MPEG4 cooperatively forming one macro block, which has the smallest prediction residual, is allocated to a 16×16 motion vector, to produce the 16×16 motion vector.

12. The motion vector conversion method according to claim 1, wherein in the case where any of one or more macro blocks in said frame to be dropped, which overlap with a macro block of a motion vector in the P frame next to said P frame to be dropped in order to be referred to, is different from a macro block whose DCT coefficients are not coded and a macro block free from motion compensation, if all of the overlapping macro blocks in said frame to be dropped are intra-macro blocks, then a zero motion vector is selected.

13. The motion vector conversion method according to claim 1, wherein in the case where any of one or more macro blocks in said frame to be dropped, which overlap with a macro block of a motion vector in the P frame next to said P frame to be dropped in order to be referred to, is different from a macro block whose DCT coefficients are not coded and a macro block free from motion compensation and further the overlapping macro blocks in said frame to be dropped contains at least one macro block whose macro block mode is not an intra-macro block, if a prediction mode carried out for those of the overlapping macro blocks, whose macro-block mode is not an intra-macro block, is a second field prediction, then a motion vector of a macro block having the highest parameter X is selected.

14. The motion vector conversion method according to claim 13, wherein the parameter X is a parameter selected from the group consisting of the number of pixels in each of portions of one or more macro blocks in said P frame to be dropped, which portions overlap with a macro block of a motion vector in the P frame next to said P frame to be dropped in order to be referred to, by a macro block bit number; a value obtained by dividing the number of pixels in each of portions of one or more macro blocks in said P frame to be dropped, which portions overlap with a macro block of a motion vector in the P frame next to said P frame to be dropped in order to be referred to, by a macro block quantization scale; and a value obtained by dividing the number of pixels in each of portions of one or more macro blocks in said P frame to be dropped, which portions overlap with a macro block of a motion vector in the P frame next to said P frame to be dropped in order to be referred to, by the product of a macro block quantization scale and the macro block bit number.

15. A motion vector conversion apparatus for an image information conversion apparatus to which a bit stream representative of interlaced scanned image compression information of MPEG2 is inputted and from which a bit stream representative of progressively scanned image compression information of MPEG4 is outputted, wherein 16×16 motion vectors of MPEG2 of the inputted bit stream representative of image compression information of MPEG2 are inputted and 8×8 motion vectors of MPEG4 and 16×16 motion vectors of MPEG4 are successively produced, said motion vector conversion apparatus comprising:
dropping means for dropping every other one of I frames and P frames of the inputted bit stream of MPEG2 and supplying 16×16 motion vectors of MPEG2 of the remaining I frames and P frames to said motion vector production means so that a bit stream of MPEG4 of a reduced frame rate and a low bit rate may be produced by said motion vector production means.

16. The motion vector conversion apparatus according to claim 15, wherein said apparatus serves as motion vector modification means; and
said apparatus further comprises:
a buffer for storing motion vector information and macro block information in the inputted bit stream representative of image compression information of MPEG2 in each P frame to be dropped;
determination means for discriminating a motion vector to be added in said P frame to be dropped based on the information stored in said buffer; and
addition means for adding the motion vector determined by said determination means, to produce an 8×8 motion vector.

17. The motion vector conversion apparatus according to claim 16, wherein letting a parameter X be taken as a parameter associated with each motion vector in said P frame to be dropped, a motion vector having the highest parameter X in said P frame to be dropped is determined as said motion vector to be added in said P frame to be dropped.

18. The A motion vector conversion apparatus according to claim 17, wherein the parameter X is a parameter selected from the group consisting of the number of pixels in each of portions of one or more macro blocks in said P frame to be dropped, which portions overlap with a macro block of a motion vector in the P frame next to said P frame to be dropped in order to be referred to; a value obtained by dividing the number of pixels in each of portions of one or more macro blocks in said P frame to be dropped, which portions overlap with a macro block of a motion vector of the P frame next to said P frame to be dropped in order to be referred to, by a macro block bit number; a value obtained by dividing the number of pixels in each of portions of one or more macro blocks in said P frame to be dropped, which portions overlap with a macro block of a motion vector of the P frame next to said P frame to be dropped in order to be referred to, by a macro block quantization scale; and a value obtained by dividing the number of pixels in each of portions of one or more macro blocks in said P frame to be dropped, which portions overlap with a macro block of a motion vector in the P frame next to said P frame to be dropped in order to be referred to, by the product of a macro block quantization scale and the macro block bit number.

19. The motion vector conversion apparatus according to claim 16, wherein letting a parameter X be taken as a parameter associated with each motion vector in said P frame to be dropped, a motion vector having the lowest parameter X in said P frame to be dropped is determined as said motion vector to be added in said P frame to be dropped.

20. The motion vector conversion apparatus according to claim 19, wherein the parameter X is a parameter selected from the group consisting of a macro block bit number in each of portions of one or more macro blocks in said P frame to be dropped, which portions overlap with a macro block of a motion vector in the P frame next to said P frame to be dropped in order to be referred to; a macro block quantization scale in each of portions of one or more macro blocks in said P frame to be dropped, which portions overlap with a macro block of a motion vector in the P frame next to said P frame to be dropped in order to be referred to; and the product of a macro block quantization scale and the macro block bit number in each of portions of one or more macro blocks in said P frame to be dropped, which portions overlap with a macro block of a motion vector of the P frame next to said P frame to be dropped in order to be referred to.

21. The motion vector conversion apparatus according to claim 16, wherein in the case where any of one or more macro blocks in said frame to be dropped, which overlap with a macro block of a motion vector in the P frame next to said P frame to be dropped in order to be referred to, is different from a macro block whose DCT coefficients are not coded and a macro block free from motion compensation, if all of the overlapping macro blocks in said frame to be dropped are intra-macro blocks, then a zero motion vector is selected.

22. The motion vector conversion apparatus according to claim 16, wherein in the case where any of one or more macro blocks in said frame to be dropped, which overlap with a macro block of a motion vector in the P frame next to said P frame to be dropped in order to be referred to, is different from a macro block whose DCT coefficients are not coded and a macro block free from motion compensation and further the overlapping macro blocks in said frame to be dropped contains at least one macro block whose macro block mode is not an intra-macro block, if a prediction mode carried out for those of the overlapping macro blocks, whose macro-block mode is not an intra-macro block, is a second field prediction, then a motion vector of a macro block having the highest parameter X is selected.

23. The motion vector conversion apparatus according to claim 22, wherein the parameter X is a parameter selected from the group consisting of the number of pixels in each of portions of one or more macro blocks in said P frame to be dropped, which portions overlap with a macro block of a motion vector in the P frame next to said P frame to be dropped in order to be referred to; a value obtained by dividing the number of pixels in each of portions of one or more macro blocks in said P frame to be dropped, which portions overlap with a macro block of a motion vector in the P frame next to said P frame to be dropped in order to be referred to, by a macro block bit number; a value obtained by dividing the number of pixels in each of portions of one or more macro blocks in said P frame to be dropped, which portions overlap with a macro block of a motion vector in the P frame next to said P frame to be dropped in order to be referred to, by a macro block quantization scale; and a value obtained by dividing the number of pixels in each of portions of one or more macro blocks in said P frame to be dropped, which portions overlap with a macro block of a motion vector in the P frame next to said P frame to be dropped in order to be referred to, by the product of a macro block quantization scale and the macro block bit number.

24. The motion vector conversion apparatus according to claim 15, wherein said motion vector conversion apparatus serves as motion vector modification means; and a motion vector in the P frame next to said I frame to be dropped is extended twice in the temporal direction, based on motion vector information and macro block information in the inputted bit stream representative of image compression information of MPEG2, to produce an 8×8 motion vector.

25. The motion vector conversion apparatus according to claim 15, wherein said motion vector conversion apparatus serves as motion vector modification means; and an 8×8 motion vector of MPEG4 is obtained from a motion vector of MPEG2 based on motion vector information in the inputted bit stream representative of image compression information of MPEG2 by said motion vector conversion apparatus and is inputted; and a re-search for a motion vector centered at the inputted 8×8 motion vector value is performed to modify the motion vector such that one of four 8×8 motion vectors of MPEG4 cooperatively forming one macro block, which has the smallest prediction residual, is allocated to a 16×16 motion vector, to produce the 16×16 motion vector.

26. The motion vector conversion apparatus according to claim 15, wherein in the case where any of one or more macro blocks in said frame to be dropped, which overlap with a macro block of a motion vector in the P frame next to said P frame to be dropped in order to be referred to, is different from a macro block whose DCT coefficients are not coded and a macro block free from motion compensation, if all of the overlapping macro blocks in said frame to be dropped are intra-macro blocks, then a zero motion vector is selected.

27. The motion vector conversion apparatus according to claim 15, wherein in the case where any of one or more macro blocks in said frame to be dropped, which overlap with a macro block of a motion vector of the P frame next to said P frame to be dropped in order to be referred to, is different from a macro block whose DCT coefficients are not coded and a macro block free from motion compensation and further the overlapping macro blocks in said frame to be dropped contains at least one macro block whose macro block mode is not an intra-macro block, if a prediction mode carried out for those of the overlapping macro blocks, whose macro-block mode is not an intra-macro block, is a second field prediction, then a motion vector of a macro block having the highest parameter X is selected.

28. The motion vector conversion apparatus according to claim 27, wherein the parameter X is a parameter selected from the group consisting of the number of pixels in each of portions of one or more macro blocks in said P frame to be dropped, which portions overlap with a macro block of a motion vector of the P frame next to said P frame to be dropped in order to be referred to; a value obtained by dividing the number of pixels in each of portions of one or more macro blocks in said P frame to be dropped, which portions overlap with a macro block of a motion vector in the P frame next to said P frame to be dropped in order to be referred to, by a macro block bit number; a value obtained by dividing the number of pixels in each of portions of one or more macro blocks in said P frame to be dropped, which portions overlap with a macro block of a motion vector in the P frame next to said P frame to be dropped in order to be referred to, by a macro block quantization scale; and a value obtained by dividing the number of pixels in each of portions of one or more macro blocks in said P frame to be dropped, which portions overlap with a macro block of a motion vector of the P frame next to said P frame to be dropped in order to be referred to, by the product of a macro block quantization scale and the macro block bit number.

* * * * *